(12) United States Patent
Huang et al.

(10) Patent No.: US 12,507,268 B2
(45) Date of Patent: Dec. 23, 2025

(54) REMOTE INTERFERENCE SUPPRESSION METHOD AND APPARATUS AND DEVICE

(71) Applicant: HUAWEI TECHNOLOGIES CO., LTD., Guangdong (CN)

(72) Inventors: Guibing Huang, Dongguan (CN); Xinbo Jin, Dongguan (CN); Hui Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 18/105,698

(22) Filed: Feb. 3, 2023

(65) Prior Publication Data

US 2023/0189314 A1 Jun. 15, 2023

Related U.S. Application Data

(63) Continuation of application No. PCT/CN2020/107194, filed on Aug. 5, 2020.

(51) Int. Cl.
*H04W 72/541* (2023.01)
*H04W 72/1268* (2023.01)
*H04B 17/345* (2015.01)

(52) U.S. Cl.
CPC ..... *H04W 72/541* (2023.01); *H04W 72/1268* (2013.01)

(58) Field of Classification Search
CPC . H04W 72/541; H04B 7/0617; H04B 17/345; H04L 27/2602; H04L 5/0023; H04L 25/0204; H04J 11/0056

(Continued)

(56) References Cited

U.S. PATENT DOCUMENTS 8,787,186 B2 * 7/2014 Sexton ............... H04L 25/0232
370/252
10,687,252 B2 * 6/2020 Manolakos ........... H04L 5/0007
(Continued)

FOREIGN PATENT DOCUMENTS

CN 102448173 A 5/2012
CN 105991256 A 10/2016
(Continued)

OTHER PUBLICATIONS

Technical Specification Group Radio Access Network. Study on remote interference management for NR (Release 16), document TR 38866 V16.1.0, 3GPP, March (2019) (Year: 2019).*
(Continued)

*Primary Examiner* — Christopher M Crutchfield
*Assistant Examiner* — S. A.
(74) *Attorney, Agent, or Firm* — Fish & Richardson P.C.

(57) ABSTRACT

This application provides a remote interference suppression method and apparatus and a device, and is applied to the communications field, to stagger a symbol location of an interfered uplink symbol, thereby reducing impact of remote interference. In addition, zero-forcing processing is performed in a direction indicated by Q pieces of phase information corresponding to the caused remote interference, to make a signal approximate 0 to suppress the remote interference, thereby reducing the impact of the remote interference. The method includes: a first network device determines that N uplink symbols are interfered with, and then configures, by using a first mapping type of a physical uplink shared channel (PUSCH), one or more symbols other than the N uplink symbols for uplink PUSCH transmission.

20 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,903,970 B1* | 1/2021 | Shattil | H04L 27/2602 |
| 11,997,703 B2* | 5/2024 | Faxér | H04W 72/0446 |
| 12,004,209 B2* | 6/2024 | Xu | H04W 72/541 |
| 12,224,849 B2* | 2/2025 | Ghozlan | H04L 5/0073 |
| 2019/0075582 A1 | 3/2019 | Kim et al. | |
| 2021/0014751 A1* | 1/2021 | Callender | H04W 72/0446 |
| 2022/0060265 A1* | 2/2022 | Xu | H04L 5/0094 |
| 2022/0407587 A1* | 12/2022 | Fujii | H04B 7/086 |
| 2024/0163706 A1* | 5/2024 | Dinan | H04B 7/0634 |

FOREIGN PATENT DOCUMENTS

| | | |
|---|---|---|
| CN | 108112078 A | 6/2018 |
| WO | 2020016397 A1 | 1/2020 |

OTHER PUBLICATIONS

T. Liu, J.-K. Zhang and K. M. Wong, "Optimal Precoder Design for Correlated MIMO Communication Systems Using Zero-Forcing Decision Feedback Equalization," in IEEE Transactions on Signal Processing, vol. 57, No. 9, pp. 3600-3612, Sep. 2009 (Year: 2009).*

Fu, Yu. Transmitter Precoding for Interference Mitigation in Closed-loop MIMO OFDM Systems. Diss. University of Alberta, 2009 (Year: 2009) (Year: 2009).*

Guo, Shaozhen, Xiaolin Hou, and Hanning Wang. "Dynamic TDD and interference management towards 5G." 2018 IEEE Wireless Communications and Networking Conference (Wcnc). IEEE, 2018. (Year: 2018).*

Mediatek Inc., "Interference management in NR," 3GPP TSG RAN WG1 Meeting #88bis, R1-1704450, Spokane, USA, Apr. 3-7, 2017, 26 pages.

KIM et el., "Dynamic TDD Systems for 5G and Beyond: A Survey of Cross-Link Interference Mitigation," IEEE Communications Surveys and Tutorials, vol. 22, No. 4, Jul. 13, 2020, 34 pages.

Extended European Search Report in European Appln No. 20948131.6, dated Sep. 1, 2023, 9 pages.

Panasonic, "On PUSCH enhancements for NR URLLC," 3GPP TSG RAN WG1 #98bis, R1-1910521, Chongqing, China, Oct. 14-20, 2019, 9 pages.

Ericsson et al., "ePDCCH start symbol," 3GPP TSG-RAN WG1 #71, R1-124894, New Orleans, USA, Nov. 12-16, 2012, 3 pages.

International Search Report and Written Opinion in International Appln. No. PCT/CN2020/107194, mailed on Apr. 25, 2021, 17 pages (with English translation).

* cited by examiner

REMOTE INTERFERENCE SUPPRESSION METHOD AND APPARATUS AND DEVICE

CROSS-REFERENCE TO RELATED APPLICATIONS

This application is a continuation of International Application No. PCT/CN2020/107194, filed on Aug. 5, 2020, the disclosure of which is hereby incorporated by reference in its entirety.

TECHNICAL FIELD

Embodiments of this application relate to the communications field, and in particular, to a remote interference suppression method and apparatus and a device.

BACKGROUND

Remote interference occurs both in a long term evolution (LTE) system and a 5G system. The remote interference means: a transmission period of time exceeds an uplink-downlink guard period (GP) of a time division duplex (TDD) system after long-distance transmission. As a result, a downlink signal of an interfering base station is received in an uplink receiving slot of an interfered base station, causing interference to an uplink signal of the interfered base station. Generally, the remote interference occurs when an atmospheric duct is caused or uplink/downlink configurations of base stations are different. To be specific, a downlink special slot of the interfering base station causes interference to an uplink special slot of the interfered base station, and may also cause interference to an uplink subframe of the interfered base station. The interfered base station detects an interference increase in an uplink slot due to the remote interference. In severe cases, access of users served by the interfered base station may be affected. Consequently, the remote interference is an urgent problem to be resolved.

SUMMARY

According to a first aspect, an embodiment of this application provides a remote interference suppression method, including:

A first network device determines that N uplink symbols are interfered with, in other words, determines that at least one uplink symbol is interfered with, and then staggers a start symbol location of a subframe from the N uplink symbols. Specifically, the first network device configures, by using a first mapping type of a physical uplink shared channel (PUSCH), one or more symbols other than the N uplink symbols for physical uplink shared channel (PUSCH) transmission.

In this embodiment of this application, the first network device determines that the N uplink symbols are interfered with, and configures, by using the first mapping type of the physical uplink shared channel (PUSCH), the one or more symbols other than the N uplink symbols for the uplink PUSCH transmission. In this way, a symbol location of the interfered uplink symbol is staggered, to reduce impact of remote interference.

With reference to the first aspect of embodiments of this application, in a first implementation of the first aspect of embodiments of this application, the remote interference usually affects an uplink slot of the first network device from left to right, in other words, from a start symbol. Therefore, when the N uplink symbols are consecutive uplink symbols, the first network device may determine an uplink symbol next to the N uplink symbols as a start location.

In this embodiment of this application, when the N uplink symbols are consecutive uplink symbols, a next location may be determined as the start location. The start symbol location is staggered from the previous N interfered uplink symbols, so that impact of the remote interference on an available symbol is reduced, thereby reducing the impact of the remote interference.

With reference to the first aspect of embodiments of this application, in a second implementation of the first aspect of embodiments of this application, the first mapping type is a type B. Because the first mapping type is the type B, a start symbol of the type B may be numbered any integer from 0 to 12, and a length of a subframe including a demodulation reference signal (DMRS) is any integer quantity of uplink symbols, where the integer ranges from 2 to 14. In addition, for the type B, a start location of an uplink symbol may be indicated by a time domain resource assignment field in downlink control information (DCI).

In this embodiment of this application, the first mapping type is the type B, so that the start symbol location may be configured. In this way, the start symbol location can be staggered from the previous N interfered uplink symbols, to improve implementability of this solution. Because the symbol location of the interfered uplink symbol is staggered, the impact of the remote interference is reduced.

With reference to the first aspect of embodiments of this application, in a third implementation of the first aspect of embodiments of this application, when noise values corresponding to the N uplink symbols are separately greater than a noise threshold, it indicates that interference noise signals received on the N uplink symbols are large. Therefore, the first network device may determine that the N uplink symbols are interfered with.

In this embodiment of this application, when the noise values corresponding to the N uplink symbols are separately greater than the noise threshold, it may be determined that the N uplink symbols are interfered with. A specific condition in which the N uplink symbols are interfered with is specifically limited, thereby improving implementability of this solution.

With reference to the first aspect of embodiments of this application, in a fourth implementation of the first aspect of embodiments of this application, the first network device determines, based on time domain resource configuration information of the first network device, time domain resource configuration information of a second network device, and a distance between the first network device and the second network device, that the N uplink symbols are interfered with. The time domain resource configuration information of the first network device is at least one of an uplink resource of the first network device or a downlink resource of the first network device, and the time domain resource configuration information of the second network device is at least one of an uplink resource of the second network device or a downlink resource of the second network device. The time domain resource configuration information is not specifically limited in embodiments of this application. In addition, the distance between the first network device and the second network device is a spatial length between the first network device and the second network device in regional space.

In this embodiment of this application, a quantity of uplink symbols that may be interfered with during the physical uplink shared channel (PUSCH) transmission may be estimated by using the time domain resource configuration information and the distance, to determine that the N uplink symbols are interfered with. This solution provides another manner of determining that the N uplink symbols are interfered with, thereby improving flexibility and implementability of this solution.

With reference to any one of the first aspect of embodiments of this application to the fourth implementation of the first aspect of embodiments of this application, in a fifth implementation of the first aspect of embodiments of this application, whether the one or more symbols other than the N uplink symbols need to be configured for the uplink PUSCH transmission by using the first mapping type may be determined in two manners. In a first manner, the distance between the first network device and the second network device is less than a distance threshold. To be specific, if the distance between the first network device and the second network device is excessively short, strength of mutual remote interference may be excessively strong. In this case, the N interfered symbol locations may be staggered, and an appropriate start symbol location may be selected to block the interfered symbol. In a second manner, N is less than a remote interference quantity threshold. If the quantity of interfered uplink symbols is large, a manner of staggering the N interfered symbol locations reduces a quantity of available uplink symbols in the subframe and may affect an uplink throughput. Therefore, when the quantity of interfered uplink symbols is small, in other words, N is less than the remote interference quantity threshold, the N interfered symbol locations may be staggered, and an appropriate start symbol location may be selected to block the interfered symbol. An uplink symbol that is not interfered with or is less interfered with is for carrying data and configuring information, to transmit PUSCH data, thereby suppressing the remote interference.

In this embodiment of this application, whether the one or more symbols other than the N uplink symbols need to be configured for the uplink PUSCH transmission by using the first mapping type is determined in the two manners, to avoid a problem that the quantity of available uplink symbols is small because the N interfered symbol locations are staggered when N is large. Therefore, the N interfered symbol locations are staggered when a condition is met, thereby improving the implementability of this solution.

According to a second aspect, an embodiment of this application provides another remote interference suppression method, including:

A first network device determines the first symbol that is interfered with in a subframe as a start uplink symbol, where the start uplink symbol includes S idle resource blocks. The idle resource block is a resource block that carries no data. Therefore, a received signal on the S idle resource blocks is an interference noise signal, and S first interference covariance matrices may be determined based on the S idle resource blocks included in the start uplink symbol, where the S first interference covariance matrices include the interference noise signal received on the S idle resource blocks. Then, the first network device averages the S first interference covariance matrices corresponding to the S idle resource blocks to obtain a first average matrix, then performs singular value decomposition (SVD) on the first average matrix to obtain a first eigenvector matrix, and finally selects first Q columns in the first eigenvector matrix, where the first Q columns in the first eigenvector matrix are Q directions in which remote interference is caused. In this way, a submatrix indicating Q pieces of phase information of the remote interference may be generated. The first network device selects the first Q columns in the first eigenvector matrix to generate the submatrix indicating the Q pieces of phase information of the remote interference, calculates a zero-forcing matrix based on the submatrix, and then performs, based on the zero-forcing matrix, zero-forcing processing on an interference noise signal corresponding to a demodulation reference signal, to obtain a second interference covariance matrix. The zero-forcing processing is for making a signal indicated by the Q pieces of phase information approximate 0. Finally, the first network device determines a downlink transmitting weight and an uplink equalization weight based on the second interference covariance matrix.

In this embodiment of this application, the first network device performs zero-forcing processing in the direction indicated by the Q pieces of phase information, to make the signal approximate 0 to suppress the remote interference. Therefore, the downlink transmitting weight and the uplink equalization weight are determined, demodulation performance is improved by using the determined uplink equalization weight, and interference to another network device is avoided by using the determined downlink transmitting weight, thereby reducing impact of the remote interference.

With reference to the second aspect of embodiments of this application, in a first implementation of the second aspect of embodiments of this application, when strength of interference caused by a downlink signal of the first network device to an uplink signal of a second network device is equal to strength of interference caused by a downlink signal of the second network device to an uplink signal of the first network device, an uplink interference characteristic and a downlink interference characteristic may be calculated by using the idle resource block included in the first symbol that is interfered with in the subframe.

In this embodiment of this application, when mutual interference between the network devices is equal, the network device may calculate the uplink interference characteristic and the downlink interference characteristic by using the idle resource block included in the first symbol that is interfered with in the subframe, to improve implementability of this solution.

With reference to the second aspect of embodiments of this application or the first implementation of the second aspect of embodiments of this application, in a second implementation of the second aspect of embodiments of this application, the first network device averages the second interference covariance matrix corresponding to the S idle resource blocks to obtain a second average matrix, and then determines the downlink transmitting weight and the uplink equalization weight based on the second average matrix.

In this embodiment of this application, the second average matrix obtained by averaging the second interference covariance matrix can more accurately reflect the signal on the idle resource block, to improve accuracy of determining the downlink transmitting weight and the uplink equalization weight, so that the demodulation performance is further improved, and the interference to another network device is further avoided, thereby reducing the impact of the remote interference.

With reference to the second implementation of the second aspect of embodiments of this application, in a third implementation of the second aspect of embodiments of this application, a channel estimation result may be further determined based on a received signal, and is obtained after zero-forcing processing is performed through on the zero-forcing matrix based on the received signal. Then, the downlink transmitting weight and the uplink equalization weight are determined based on the second average matrix and the channel estimation result.

In this embodiment of this application, because the determined channel estimation result is obtained after the zero-forcing processing is performed based on the zero-forcing matrix, the signal may be made approximate 0 to suppress the remote interference, thereby further reducing the impact of the remote interference.

According to a third aspect, an embodiment of this application provides still another remote interference suppression method, including:

A first network device receives a sounding sequence from a second network device, where the sounding sequence may be a sounding sequence sent through each antenna of the second network device, or may be sounding sequences alternately sent to the first network device through a plurality of groups of antennas, to improve a sending rate, where the second network device groups every eight antennas into one group. Further, after receiving the sounding sequence, the first network device may perform calculation on the sounding sequence by using a plurality of channel estimation algorithms, and accordingly obtain first channel information that is from the second network device to the first network device. To reduce an information storage amount, the first network device quantizes the first channel information to obtain second channel information; determines, based on the second channel information, a submatrix indicating Q pieces of phase information of remote interference; calculates a zero-forcing matrix based on the submatrix; then performs, based on the zero-forcing matrix, zero-forcing processing on an interference noise signal corresponding to a demodulation reference signal, to obtain a second interference covariance matrix, where the zero-forcing processing is for making a signal indicated by the Q pieces of phase information approximate 0; and finally determines an uplink equalization weight based on the second interference covariance matrix.

In this embodiment of this application, when strength of interference caused by the first network device to the second network device is different from strength of interference caused by the second network device to the first network device, the zero-forcing processing is performed in a direction indicated by the Q pieces of phase information, to make the signal approximate 0 to suppress the remote interference. Therefore, the uplink equalization weight is determined, and demodulation performance is improved by using the determined uplink equalization weight, to reduce impact of the remote interference.

With reference to the third aspect of embodiments of this application, in a first implementation of the third aspect of embodiments of this application, when strength of interference caused by a downlink signal of the first network device to an uplink signal of the second network device is not equal to strength of interference caused by a downlink signal of the second network device to an uplink signal of the first network device, an uplink interference characteristic needs to be calculated by using the sounding sequence sent through the actual antenna.

In this embodiment of this application, when the mutual interference between the network devices is not equal, the network device needs to calculate the uplink interference characteristic by using the sounding sequence sent through the actual antenna, and perform zero-forcing correction on the uplink equalization weight, to improve the demodulation performance, thereby improving implementability of this solution.

With reference to the third aspect of embodiments of this application or the first implementation of the third aspect of embodiments of this application, in a second implementation of the third aspect of embodiments of this application, the first network device determines phase information of first Q beams in the second channel information as the Q pieces of phase information of Q remote interferences, and then generates the submatrix based on the Q pieces of phase information of the Q remote interferences.

This embodiment of this application provides a manner of determining the submatrix, so that the submatrix can be directly determined based on the phase information of the first Q beams in the second channel information, to improve the implementability of this solution.

With reference to the third aspect of embodiments of this application or the first implementation of the third aspect of embodiments of this application, in a third implementation of the third aspect of embodiments of this application, the first network device performs singular value decomposition on the second channel information to determine a second eigenvector matrix, selects first Q columns in the second eigenvector matrix, determines the first Q columns as the Q pieces of phase information of Q remote interferences, and finally generates the submatrix based on the Q pieces of phase information of the Q remote interferences.

This embodiment of this application provides another manner of determining the submatrix. After the singular value decomposition is performed on the second channel information, the Q pieces of phase information of the Q remote interferences need to be selected to determine the submatrix. This improves not only the implementability but also flexibility of this solution.

With reference to any one of the third aspect of embodiments of this application to the third implementation of the third aspect of embodiments of this application, in a fourth implementation of the third aspect of embodiments of this application, the first network device averages the second interference covariance matrix corresponding to S idle resource blocks to obtain a second average matrix, and then determines the uplink equalization weight based on the second average matrix.

In this embodiment of this application, the second average matrix obtained by averaging the second interference covariance matrix can more accurately reflect a signal on the idle resource block, to improve accuracy of determining the uplink equalization weight, so that the demodulation performance is further improved, and the impact of the remote interference is reduced.

With reference to the fourth implementation of the third aspect of embodiments of this application, in a fifth implementation of the third aspect of embodiments of this application, a channel estimation result may be further determined based on a received signal, and is obtained after zero-forcing processing is performed through the zero-forcing matrix based on the received signal. Then, the uplink equalization weight is determined based on the second average matrix and the channel estimation result.

In this embodiment of this application, because the determined channel estimation result is obtained after the zero-forcing processing is performed based on the zero-forcing matrix, the signal may be made approximate 0 to suppress the remote interference, thereby further reducing the impact of the remote interference.

According to a fourth aspect, an embodiment of this application provides yet another remote interference suppression method, including:

A first network device receives a sounding sequence from a second network device, where the sounding sequence may be a sounding sequence sent through each antenna of the second network device, or may be sounding sequences alternately sent to the first network device through a plurality of groups of antennas, to improve a sending rate, where the second network device groups every eight antennas into one group. Further, after receiving the sounding sequence, the first network device may perform calculation on the sounding sequence by using a plurality of channel estimation algorithms, and accordingly obtain first channel information that is from the second network device to the first network device. To reduce an information storage amount, the first network device quantizes the first channel information to obtain second channel information; determines, based on the second channel information, a submatrix indicating Q pieces of phase information of remote interference; calculates a zero-forcing matrix based on the submatrix; then performs, based on the zero-forcing matrix, zero-forcing processing on an interference noise signal corresponding to a demodulation reference signal, to obtain a second interference covariance matrix, where the zero-forcing processing is for making a signal indicated by the Q pieces of phase information approximate 0; and finally determines a downlink transmitting weight based on the second interference covariance matrix.

In this embodiment of this application, when strength of interference caused by the first network device to the second network device is different from strength of interference caused by the second network device to the first network device, the zero-forcing processing is performed in a direction indicated by the Q pieces of phase information, to make the signal approximate 0 to suppress the remote interference. Therefore, the downlink transmitting weight is determined, and interference to another network device is avoided by using the determined downlink transmitting weight, to reduce impact of the remote interference.

With reference to the fourth aspect of embodiments of this application, in a first implementation of the fourth aspect of embodiments of this application, when strength of interference caused by a downlink signal of the first network device to an uplink signal of the second network device is not equal to strength of interference caused by a downlink signal of the second network device to an uplink signal of the first network device, a downlink interference characteristic needs to be calculated by using the sounding sequence sent through the actual antenna.

In this embodiment of this application, when the mutual interference between the network devices is not equal, the network device needs to calculate the downlink interference characteristic by using the sounding sequence sent through the actual antenna, and perform zero-forcing correction on the downlink transmitting weight, to avoid the interference to another network device, thereby reducing the impact of the remote interference, and improving implementability of this solution.

With reference to the fourth aspect of embodiments of this application or the first implementation of the fourth aspect of embodiments of this application, in a second implementation of the fourth aspect of embodiments of this application, the first network device determines phase information of first Q beams in the second channel information as the Q pieces of phase information of Q remote interferences, and then generates the submatrix based on the Q pieces of phase information of the Q remote interferences.

This embodiment of this application provides a manner of determining the submatrix, so that the submatrix can be directly determined based on the phase information of the first Q beams in the second channel information, to improve the implementability of this solution.

With reference to the fourth aspect of embodiments of this application or the first implementation of the fourth aspect of embodiments of this application, in a third implementation of the fourth aspect of embodiments of this application, the first network device performs singular value decomposition on the second channel information to determine a second eigenvector matrix, selects first Q columns in the second eigenvector matrix, determines the first Q columns as the Q pieces of phase information of Q remote interferences, and finally generates the submatrix based on the Q pieces of phase information of the Q remote interferences.

This embodiment of this application provides another manner of determining the submatrix. After the singular value decomposition is performed on the second channel information, the Q pieces of phase information of the Q remote interferences need to be selected to determine the submatrix. This improves not only the implementability but also flexibility of this solution.

With reference to any one of the fourth aspect of embodiments of this application to the third implementation of the fourth aspect of embodiments of this application, in a fourth implementation of the fourth aspect of embodiments of this application, the first network device averages the second interference covariance matrix corresponding to S idle resource blocks to obtain a second average matrix, and then determines the downlink transmitting weight based on the second average matrix.

In this embodiment of this application, the second average matrix obtained by averaging the second interference covariance matrix can more accurately reflect a signal on the idle resource block, to improve accuracy of determining the downlink transmitting weight, so that the interference to another network device is further avoided, and the impact of the remote interference is reduced.

With reference to the fourth implementation of the fourth aspect of embodiments of this application, in a fifth implementation of the fourth aspect of embodiments of this application, a channel estimation result may be further determined based on a received signal, and is obtained after zero-forcing processing is performed through the zero-forcing matrix based on the received signal. Then, the downlink transmitting weight is determined based on the second average matrix and the channel estimation result.

In this embodiment of this application, because the determined channel estimation result is obtained after the zero-forcing processing is performed based on the zero-forcing matrix, the signal may be made approximate 0 to suppress the remote interference, thereby further reducing the impact of the remote interference.

According to a fifth aspect, an embodiment of this application provides a remote interference suppression apparatus. The remote interference suppression apparatus may be a network device or a chip in the network device. The remote interference suppression apparatus includes a processor. The processor is configured to execute a computer program or instructions, so that the remote interference suppression apparatus performs the method in the first aspect.

Optionally, the remote interference suppression apparatus further includes a memory. The processor is coupled to the memory, the memory is configured to store the computer program or the instructions, and the processor is configured to execute the computer program or the instructions in the memory.

Optionally, the remote interference suppression apparatus may further include a communication unit, and the communication unit is configured to communicate with another device or another component in the remote interference suppression apparatus. For example, the remote interference suppression apparatus is the network device, and the communication unit is a transceiver. For example, the remote interference suppression apparatus is the chip in the network device, and the communication unit is an input/output circuit or an interface of the chip.

According to a sixth aspect, an embodiment of this application provides a remote interference suppression apparatus. The remote interference suppression apparatus may be a terminal or a chip in the terminal. The remote interference suppression apparatus includes a processor. The processor is configured to execute a computer program or instructions, so that the remote interference suppression apparatus performs the method in the second aspect.

Optionally, the remote interference suppression apparatus further includes a memory. The processor is coupled to the memory, the memory is configured to store the computer program or the instructions, and the processor is configured to execute the computer program or the instructions in the memory.

Optionally, the remote interference suppression apparatus may further include a communication unit, and the communication unit is configured to communicate with another device or another component in the remote interference suppression apparatus. For example, the remote interference suppression apparatus is the terminal, and the communication unit is a transceiver. For example, the remote interference suppression apparatus is the chip in the terminal, and the communication unit is an input/output circuit or an interface of the chip.

According to a seventh aspect, an embodiment of this application provides a remote interference suppression apparatus. The remote interference suppression apparatus may be a network device or a chip in the network device. The remote interference suppression apparatus includes a processor. The processor is configured to execute a computer program or instructions, so that the remote interference suppression apparatus performs the method in the third aspect.

Optionally, the remote interference suppression apparatus further includes a memory. The processor is coupled to the memory, the memory is configured to store the computer program or the instructions, and the processor is configured to execute the computer program or the instructions in the memory.

Optionally, the remote interference suppression apparatus may further include a communication unit, and the communication unit is configured to communicate with another device or another component in the remote interference suppression apparatus. For example, the remote interference suppression apparatus is the network device, and the communication unit is a transceiver. For example, the remote interference suppression apparatus is the chip in the network device, and the communication unit is an input/output circuit or an interface of the chip.

According to an eighth aspect, an embodiment of this application provides a remote interference suppression apparatus. The remote interference suppression apparatus may be a network device or a chip in the network device. The remote interference suppression apparatus includes a processor. The processor is configured to execute a computer program or instructions, so that the remote interference suppression apparatus performs the method in the fourth aspect.

Optionally, the remote interference suppression apparatus further includes a memory. The processor is coupled to the memory, the memory is configured to store the computer program or the instructions, and the processor is configured to execute the computer program or the instructions in the memory.

Optionally, the remote interference suppression apparatus may further include a communication unit, and the communication unit is configured to communicate with another device or another component in the remote interference suppression apparatus. For example, the remote interference suppression apparatus is the network device, and the communication unit is a transceiver. For example, the remote interference suppression apparatus is the chip in the network device, and the communication unit is an input/output circuit or an interface of the chip.

According to a ninth aspect, an embodiment of this application provides a chip. The chip includes a processor and an interface circuit. The interface circuit and the processor are coupled, and the processor is configured to run a computer program or instructions, to implement the method according to any implementation of the first aspect to the fourth aspect. The interface circuit is configured to communicate with a module other than the chip.

According to a tenth aspect, an embodiment of this application provides a computer storage medium, storing a program for implementing the method according to any implementation of the first aspect to the fourth aspect. When the program is run in a remote interference suppression apparatus, the remote interference suppression apparatus is enabled to perform the method according to any implementation of the first aspect to the fourth aspect.

According to an eleventh aspect, an embodiment of this application provides a computer program product. The program product includes a program. When the program is run, the method according to any implementation of the first aspect to the fourth aspect is performed.

According to a twelfth aspect, an embodiment of this application provides a communication system, including the network device (or a chip in the network device) in the method according to any implementation of the first aspect to the fourth aspect. Alternatively, the communication system includes the remote interference suppression apparatus according to the fifth aspect to the remote interference suppression apparatus according to the eighth aspect.

It can be learned from the foregoing technical solutions that, embodiments of this application have the following advantages: The symbol location of the interfered uplink symbol is staggered, thereby reducing the impact of the remote interference. In addition, the zero-forcing processing is performed in the direction indicated by the Q pieces of phase information corresponding to the caused remote interference, to make the signal approximate 0 to suppress the remote interference, thereby reducing the impact of the remote interference.

DESCRIPTION OF EMBODIMENTS

The following clearly and completely describes technical solutions in embodiments of this application with reference to the accompanying drawings in embodiments of this application. It is clear that the described embodiments are merely some rather than all of embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that data termed in such a way is interchangeable in proper circumstances, so that embodiments described herein can be implemented in other orders than the order illustrated or described herein. In addition, the terms "include" and "have" and any other variants are intended to cover non-exclusive inclusion. For example, a process, method, system, product, or device that includes a list of steps or units is not necessarily limited to those expressly listed steps or units, but may include other steps or units not expressly listed or inherent to such a process, method, product, or device.

To better understand a remote interference suppression method and apparatus and a device that are disclosed in embodiments of this application, the following describes the technical solutions in this application with reference to the accompanying drawings in this application.

Figure 1:
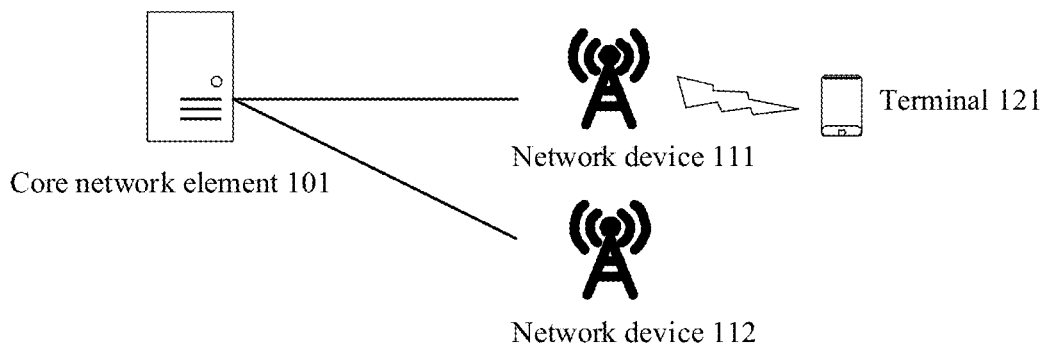
FIG. 1 is a schematic diagram of a system architecture of a communication system according to an embodiment of this application.

First, a system architecture of a communication system used in embodiments of the present invention is described. FIG. 1 is a schematic diagram of a system architecture of a communication system according to an embodiment of this application. The technical solutions in embodiments of this application may be applied to the communication system shown in FIG. 1. The communication system includes a core network element 101, a network device 111, and a network device 112. The core network element 101 may be connected to the network device 111 and the network device 112. A terminal 121 may communicate with the network device 111. It should be noted that the core network element, the network devices, and the terminal that are included in the communication system shown in FIG. 1 are merely an example, and an interface connection relationship between the network devices is also merely an example. In embodiments of this application, types and quantities of network elements included in the communication system and a connection relationship between the network elements are not limited thereto.

The communication system may be a communication system supporting a fourth-generation (4G) access technology, for example, a long term evolution (LTE) access technology. Alternatively, the communication system may be a communication system supporting a fifth-generation (5G) access technology, for example, a new radio (NR) access technology. Alternatively, the communication system may be a communication system supporting a third-generation (3G) access technology, for example, a universal mobile telecommunications system (UMTS) access technology. Alternatively, the communication system may be a communication system supporting a second-generation (2G) access technology, for example, a global system for mobile communications (GSM) access technology. Alternatively, the communication system may be a communication system supporting a plurality of wireless technologies, for example, an LTE technology and an NR technology. In addition, the communication system may be used in a future-oriented communication technology.

The network device 111 and the network device 112 in FIG. 1 each may be a device that is on an access network side and that is configured to support access of the terminal to the communication system, for example, may be a base transceiver station (BTS) and a base station controller (BSC) in the communication system supporting the 2G access technology, a NodeB and a radio network controller (RNC) in the communication system supporting the 3G access technology, an evolved NodeB (eNB) in the communication system supporting the 4G access technology, or a next generation NodeB (gNB), a transmission reception point (TRP), a relay node, or an access point (AP) in the communication system supporting the 5G access technology.

The core network element 101 in FIG. 1 may control one or more network devices, centrally manage resources in the system, or configure a resource for the terminal. For example, the core network element may be a serving general packet radio service (GPRS) support node (serving GPRS support node, SGSN) or a gateway GPRS support node (GGSN) in the communication system supporting the 3G access technology, a mobility management entity (MME) or a serving gateway (SGW) in the communication system supporting the 4G access technology, or an access and mobility management function (AMF) network element or a user plane function (UPF) network element in the communication system supporting the 5G access technology.

The terminal 121 in FIG. 1 may be a device that provides a voice or data connectivity for a user. For example, the terminal may also be referred to as user equipment (UE), a mobile station, a subscriber unit, a station, or terminal equipment (TE). The terminal may be a cellular phone, a personal digital assistant (PDA), a wireless modem, a handheld device, a laptop computer, a cordless phone, a wireless local loop (WLL) station, a tablet computer (pad), or the like. With development of wireless communication technologies, any device that can access a communication system, can communicate with a network side in the communication system, or can communicate with another object through the communication system may be the terminal in embodiments of this application. For example, the device may be a terminal and a vehicle in intelligent transportation, a household device in smart household, an electricity meter reading instrument in a smart grid, a voltage monitoring instrument, an environment monitoring instrument, a video surveillance instrument in an intelligent security network, or a cashing machine. In embodiments of this application, the terminal may communicate with a network device, for example, the network device 111 or the network device 112. A plurality of terminals may communicate with each other. The terminal may be fixed or movable.

Figure 2:
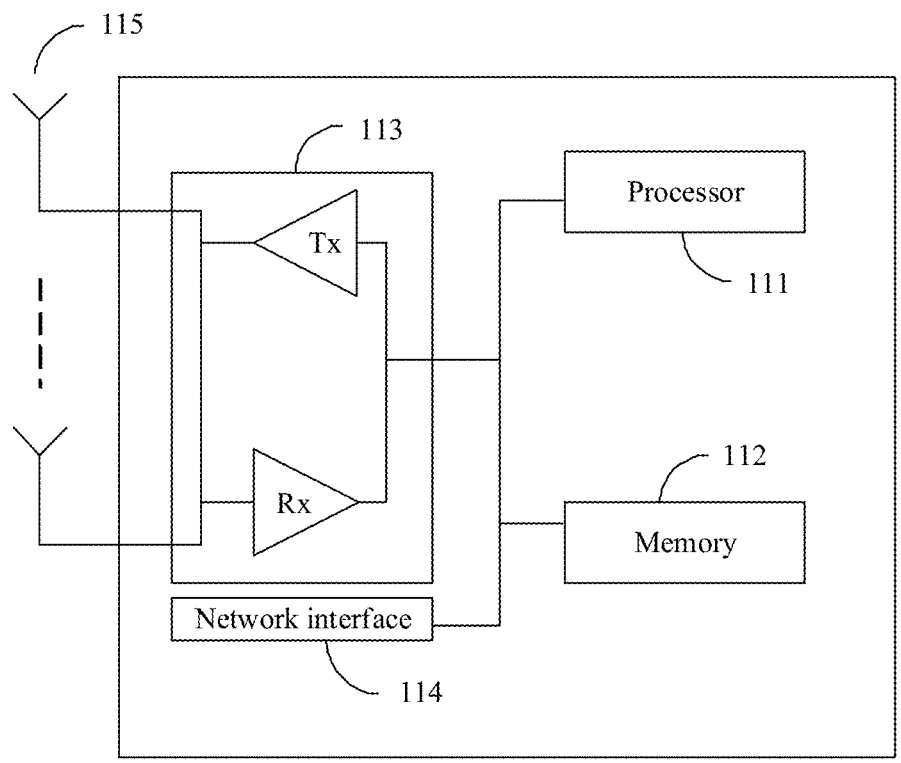
FIG. 2 is a schematic diagram of a structure of a network device according to an embodiment of this application.

Specifically, the following describes the network device in the communication system in detail. FIG. 2 is a schematic diagram of a structure of a network device according to an embodiment of this application. For structures of the network device 111 and the network device 112 shown in FIG. 1, refer to the structure shown in FIG. 2.

The network device includes at least one processor 111, at least one memory 112, at least one transceiver 113, at least one network interface 114, and one or more antennas 115. The processor 111, the memory 112, the transceiver 113, and the network interface 114 are connected, for example, through a bus. In embodiments of this application, the connection may include various interfaces, transmission lines, buses, or the like. This is not limited in embodiments. The antenna 115 is connected to the transceiver 113. The network interface 114 is configured to connect the network device to another communication device through a communication link. For example, the network interface 114 may include a network interface, for example, an S1 interface, between the network device and a core network element, and may include a network interface, for example, an X2 interface or an Xn interface, between the network device and another network device (for example, another network device or a core network element).

The processor 111 is mainly configured to: process a communication protocol and communication data, control the entire network device, execute a software program, and process data of the software program, for example, is configured to support the network device in performing actions described in embodiments. The network device may include a baseband processor and a central processing unit. The baseband processor is mainly configured to process the communication protocol and the communication data. The central processing unit is mainly configured to control the entire network device, execute the software program, and process the data of the software program. The processor 111 in FIG. 2 may integrate functions of the baseband processor and the central processing unit. A person skilled in the art may understand that the baseband processor and the central processing unit may be processors independent of each other, and are interconnected by using technologies such as a bus. A person skilled in the art may understand that the network device may include a plurality of baseband processors to adapt to different network standards, and may include a plurality of central processing units to enhance a processing capability of the network device. The components of the network device may be connected through various buses. The baseband processor may also be expressed as a baseband processing circuit or a baseband processing chip. The central processing unit may also be expressed as a central processing circuit or a central processing chip. The function of processing the communication protocol and the communication data may be built in the processor, or may be stored in the memory in a form of a software program, and the processor executes the software program to implement a baseband processing function.

The memory is mainly configured to store the software program and the data. The memory 112 may exist independently, and is connected to the processor 111. Optionally, the memory 112 and the processor 111 may be integrated together, for example, integrated into a chip. The memory 112 can store program code for executing the technical solutions in embodiments of this application, and the processor 111 controls the execution. Various types of computer program code that are executed may also be considered as drivers of the processor 111.

FIG. 2 shows only one memory and one processor. In an actual network device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in embodiments of this application.

The transceiver 113 may be configured to support receiving or sending of a radio frequency signal between the network device and a terminal, and the transceiver 113 may be connected to the antenna 115. The transceiver 113 includes a transmitter (Tx) and a receiver (Rx). Specifically, the one or more antennas 115 may receive the radio frequency signal. The receiver (Rx) in the transceiver 113 is configured to receive the radio frequency signal from the antenna, convert the radio frequency signal into a digital baseband signal or a digital intermediate frequency signal, and provide the digital baseband signal or the digital intermediate frequency signal for the processor 111, so that the processor 111 further processes the digital baseband signal or the digital intermediate frequency signal, for example, demodulates and decodes the digital baseband signal or the digital intermediate frequency signal. In addition, the transmitter (Tx) in the transceiver 113 is further configured to receive a modulated digital baseband signal or a modulated digital intermediate frequency signal from the processor 111, convert the modulated digital baseband signal or the modulated digital intermediate frequency signal into a radio frequency signal, and send the radio frequency signal through the one or more antennas 115. Specifically, the receiver (Rx) may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter (Tx) may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

The transceiver may also be referred to as a transceiver unit, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter, a transmitting circuit, or the like.

Next, some terms or concepts in embodiments of this application are described, to help a person skilled in the art have a better understanding.

1. First Mapping Type.

The first mapping type is a type B, a start symbol of the type B may be a symbol numbered any integer from 0 to 12, and a length of a subframe including a DMRS is any integer quantity of uplink symbols, where the integer ranges from 2 to 14. In addition, for the type B, a start location of an uplink symbol may be indicated by a time domain resource assignment field in DCI.

2. Second Mapping Type.

The second mapping type is a type A, a start symbol of the type A is a fixed symbol 0, and a length of a subframe including a DMRS is less than or equal to 14 uplink symbols.

Further, in embodiments, different mapping types may be obtained by using a physical uplink shared channel (PUSCH), and include the first mapping type and the second mapping type. Therefore, corresponding remote interference suppression methods may be used by using the different mapping types. The following describes different remote interference suppression methods in embodiments of this application in detail by using a network device as an execution body.

Figure 3:
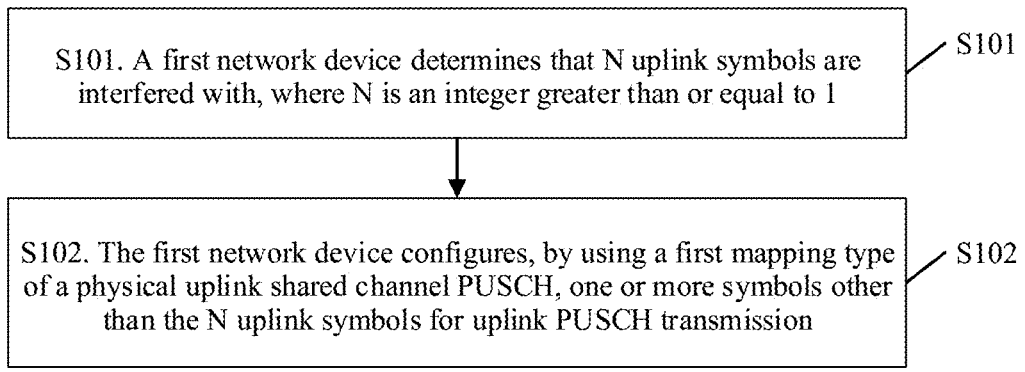
FIG. 3 is a schematic diagram of an embodiment of a remote interference suppression method according to embodiments of this application.

FIG. 3 is a schematic diagram of an embodiment of a remote interference suppression method according to embodiments of this application. The remote interference suppression method includes the following steps.

S101. A first network device determines that N uplink symbols are interfered with, where N is an integer greater than or equal to 1.

In this embodiment, that a first network device determines that N uplink symbols are interfered with means: the first network device determines that at least one uplink symbol is interfered with.

Optionally, remote interference usually affects an uplink slot of the first network device from left to right, in other words, from a start symbol, and a start symbol location of a type B may be configured. Therefore, the N uplink symbols are consecutive uplink symbols, and the first network device determines an uplink symbol next to the N uplink symbols as the start location.

Descriptions are provided by using an example in which it is determined that four uplink symbols are interfered with. When the four uplink symbols are consecutive uplink symbols, a location of an uplink symbol next to the four uplink symbols, namely, a location of the fifth uplink symbol, may be determined as the start location. It should be understood that the foregoing example is merely for understanding this solution. A specific start location should be flexibly determined based on an actual case of the N uplink symbols. This is not limited herein.

Further, the first network device may determine, by calculating a noise value or by using a distance and time domain resource configuration information, that the N uplink symbols are interfered with. The following describes in detail two methods for determining that the N uplink symbols are interfered with in this embodiment.

(1) It is determined, through calculation of the noise value, that the N uplink symbols are interfered with.

Specifically, the first network device obtains interference noise signals corresponding to all uplink symbols in a subframe, and then performs spectrum analysis on the interference noise signals corresponding to all the uplink symbols in the subframe to obtain corresponding noise values. When noise values corresponding to the N uplink symbols in the subframe are all greater than a noise threshold, it indicates that strength of the remote interference is excessively high, and it is difficult for the first network device to suppress the remote interference by using an algorithm. In this case, the first network device may determine that the N uplink symbols are interfered with.

For example, in this embodiment, the noise threshold is 10 decibels (dB), and the subframe has 14 uplink symbols. First, interference noise signals corresponding to the 14 uplink symbols in the subframe are obtained, and then noise values corresponding to the 14 uplink symbols are obtained after spectrum analysis. If noise values corresponding to four uplink symbols are greater than 10 dB, it may be determined that the four uplink symbols are interfered with. It should be understood that, in actual application, the noise threshold may alternatively be 12 dB, 15 dB, 20 dB, or the like. The foregoing example is merely for understanding this solution. A specific noise threshold and the N uplink symbols should be flexibly determined based on an actual case of the noise value and an actual requirement. This is not limited herein.

(2) It is determined by using the distance and the time domain resource configuration information that the N uplink symbols are interfered with.

Specifically, the first network device obtains time domain resource configuration information of the first network device, time domain resource configuration information of a second network device, and the distance between the first network device and the second network device, and determines, based on the obtained time domain resource configuration information and the obtained distance, that the N uplink symbols are interfered with. The time domain resource configuration information of the first network device is at least one of an uplink resource of the first network device or a downlink resource of the first network device, and the time domain resource configuration information of the second network device is at least one of an uplink resource of the second network device or a downlink resource of the second network device. The time domain resource configuration information is not specifically limited in embodiments of this application. In addition, the distance between the first network device and the second network device is a spatial length between the first network device and the second network device in regional space. A quantity of uplink symbols that may be interfered with during physical uplink shared channel (PUSCH) transmission may be estimated by using the time domain resource configuration information and the distance, to determine that the N uplink symbols are interfered with.

S102. The first network device configures, by using a first mapping type of a physical uplink shared channel (PUSCH), one or more symbols other than the N uplink symbols for the uplink PUSCH transmission.

In this embodiment, the first network device staggers the start symbol location of the subframe from the N uplink symbols. Specifically, the first network device configures, by using the first mapping type of the physical uplink shared channel (PUSCH), the one or more symbols other than the N uplink symbols for the physical uplink shared channel (PUSCH) transmission.

Figure 4:
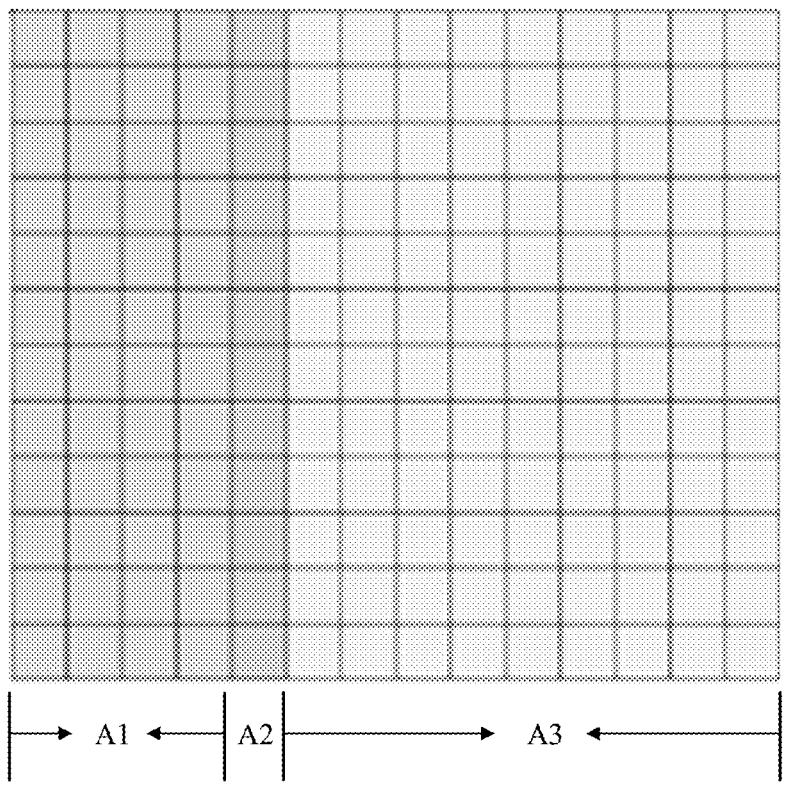
FIG. 4 is a schematic diagram of an embodiment of determining a start symbol location according to embodiments of this application.

For example, when the N uplink symbols are consecutive uplink symbols, the first network device determines the uplink symbol next to the N uplink symbols as the start location. For ease of understanding, descriptions are provided by using an example in which a length of a subframe including a DMRS is 14 uplink symbols and it is determined that four uplink symbols are interfered with. FIG. 4 is a schematic diagram of an embodiment of determining a start symbol location according to embodiments of this application. As shown in FIG. 4, A1 indicates four uplink symbols, A2 indicates a demodulation reference signal DMRS, and A3 indicates other uplink symbols. To be specific, after the four uplink symbols A1 are determined in step S101, because the four uplink symbols are consecutive uplink symbols, the demodulation reference signal A2 may be used as the start symbol location, and the other uplink symbols A3 are all data symbols. Because the first fixed symbol of a subframe is a symbol 0, the determined start symbol location is a symbol 4, and the four interfered uplink symbols A1 are staggered, thereby reducing impact of remote interference. It should be understood that the foregoing example is merely for understanding this solution. A specific symbol configured for the uplink PUSCH transmission needs to be flexibly determined based on the actual case of the N uplink symbols. This is not limited herein.

Optionally, after it is determined in step S101 that the N uplink symbols are interfered with, whether to perform step S102 needs to be further determined. In two determining manners provided in this embodiment, in a first manner, step S102 is performed if the distance between the first network device and the second network device is less than a distance threshold, to be specific, if the distance between the first network device and the second network device is excessively short, strength of mutual remote interference may be excessively high. In this case, the N interfered symbol locations may be staggered, and an appropriate start symbol location may be selected to block the interfered symbol. In a second manner, step S102 is performed if N is less than a remote interference quantity threshold. If the quantity of interfered uplink symbols is large, a manner of staggering the N interfered symbol locations reduces a quantity of available uplink symbols in the subframe and may affect an uplink throughput. Therefore, when the quantity of interfered uplink symbols is small, in other words, N is less than the remote interference quantity threshold, the N interfered symbol locations may be staggered, and an appropriate start symbol location may be selected to block the interfered symbol. An uplink symbol that is not interfered with or is less interfered with is for carrying data and configuring information, to transmit PUSCH data, thereby suppressing the remote interference.

It may be understood that, because the mutual interference between the network devices may be equal or not equal, in different cases, the first network device may suppress the remote interference in different manners. In a case, strength of interference caused by a downlink signal of the first network device to an uplink signal of the second network device is equal to strength of interference caused by a downlink signal of the second network device to an uplink signal of the first network device. In another case, strength of interference caused by a downlink signal of the first network device to an uplink signal of the second network device is not equal to strength of interference caused by a downlink signal of the second network device to an uplink signal of the first network device.

The following separately describes remote interference suppression methods used in the foregoing two cases.

(1) The strength of the interference caused by the downlink signal of the first network device to the uplink signal of the second network device is equal to the strength of the interference caused by the downlink signal of the second network device to the uplink signal of the first network device.

Figure 5:
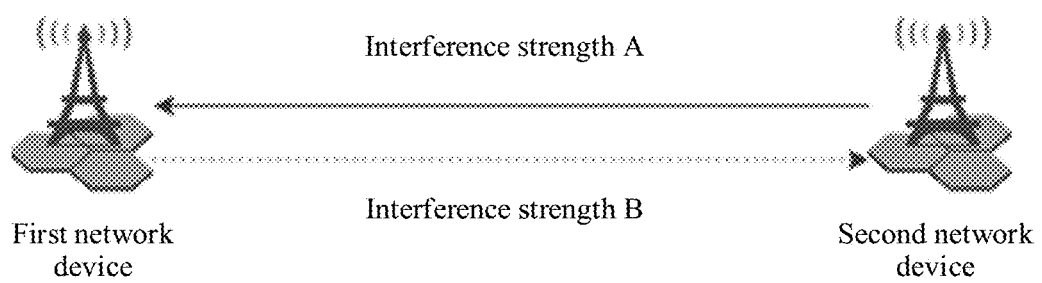
FIG. 5 is a schematic diagram of an embodiment in which mutual interference between network devices is equal according to embodiments of this application.
Figure 6:
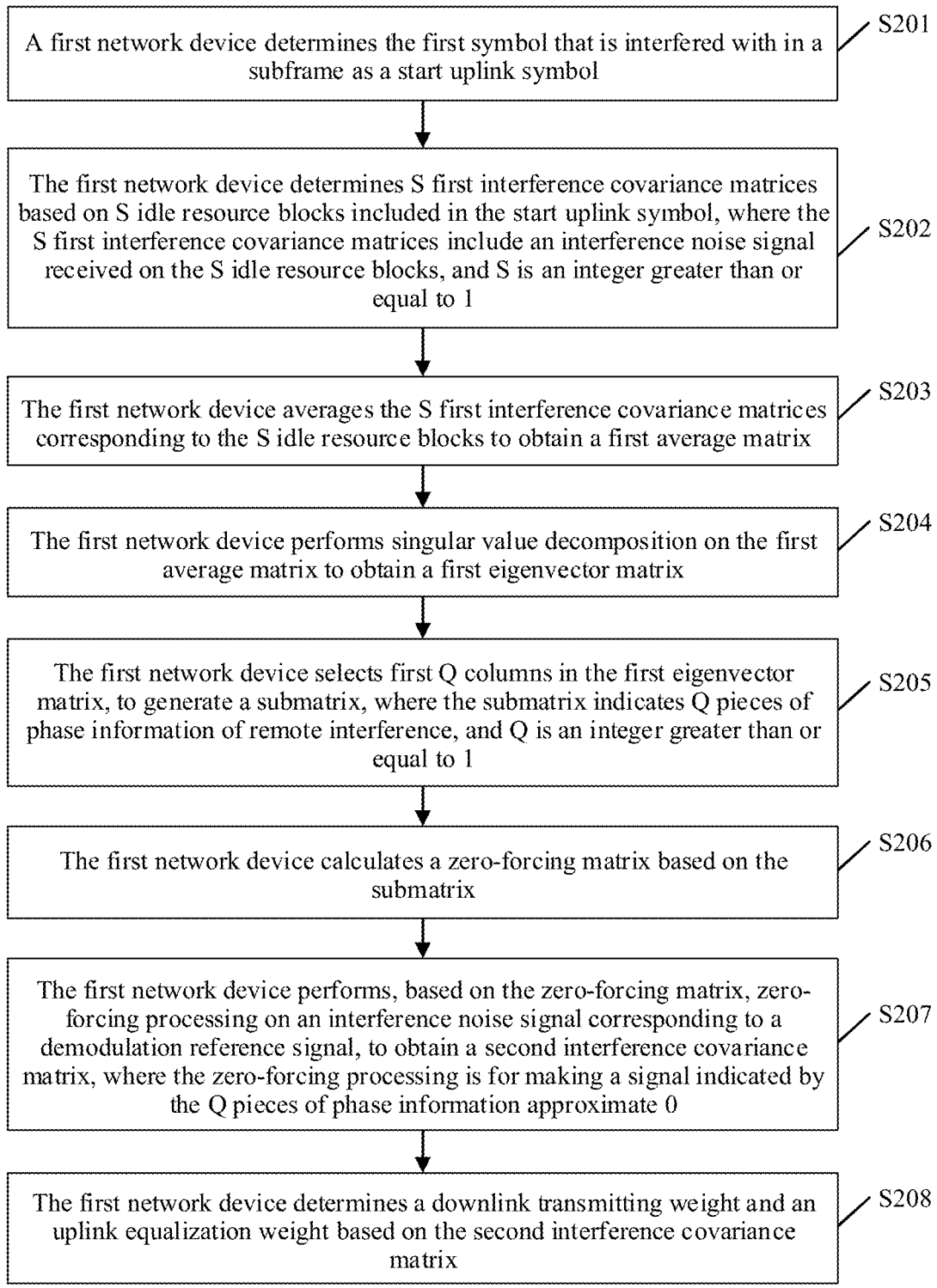
FIG. 6 is a schematic diagram of another embodiment of a remote interference suppression method according to embodiments of this application.

Specifically, in a scenario in which the mutual interference between the network devices is equal, FIG. 5 is a schematic diagram of an embodiment in which mutual interference between network devices is equal according to embodiments of this application. The strength of the interference caused by the downlink signal of the second network device to the uplink signal of the first network device is interference strength A, and the strength of the interference caused by the downlink signal of the first network device to the uplink signal of the second network device is interference strength B. When the interference strength A is equal to the interference strength B, an interference characteristic may be calculated by using an idle resource block included in the first symbol that is interfered with in the subframe. For ease of understanding, FIG. 6 is a schematic diagram of another embodiment of a remote interference suppression method according to embodiments of this application. The remote interference suppression method includes the following steps.

S201. A first network device determines the first symbol that is interfered with in a subframe as a start uplink symbol.

In this embodiment, the first network device determines the first symbol that is interfered with in the subframe as the start uplink symbol. If a second mapping type (Type A) is used, because a start symbol of the type A is a fixed symbol 0, and remote interference usually affects an uplink slot of the first network device from left to right, in other words, from the symbol 0, for the second mapping type, the first symbol that is interfered with is the symbol 0. For a first mapping type (Type B), the first symbol that is interfered with should be a start symbol indicated by a time domain resource assignment field in DCI. A specific start uplink symbol should be flexibly determined based on an actual case of the mapping type. This is not limited herein.

S202. The first network device determines S first interference covariance matrices based on S idle resource blocks included in the start uplink symbol, where the S first interference covariance matrices include an interference noise signal received on the S idle resource blocks, and S is an integer greater than or equal to 1.

In this embodiment, because the start uplink symbol includes the S idle resource blocks, and the idle resource block is a resource block that carries no data, a received signal on the S idle resource blocks is the interference noise signal. Therefore, the first network device may determine the S first interference covariance matrices based on the S idle resource blocks included in the start uplink symbol, where the S first interference covariance matrices include the interference noise signal received on the S idle resource blocks.

For ease of understanding, the following further describes the foregoing step by using a formula. First, the first symbol that is interfered with is determined as the start uplink symbol. In this embodiment, the symbol 0 is used as an example, and then a first interference covariance matrix corresponding to each idle resource block on the symbol 0 is calculated.

An example in which a received signal on an $i^{th}$ idle resource block in the start uplink symbol $r_i \in C^{N*Rank}$ is used. Therefore, a first interference covariance matrix corresponding to the $i^{th}$ idle resource block may be calculated by using the following formula:

$$Ruu(i) = \frac{1}{12}\sum_{k=i*12}^{i*12+11} r_k r_k^H$$

Ruu(i) indicates the first interference covariance matrix, $r_i$ indicates the received signal on the $i^{th}$ idle resource block in the start uplink symbol, N indicates a quantity of receive antennas of the first network device, $r_k$ indicates a received signal on a $K^{th}$ subcarrier in the uplink symbol, H indicates conjugate transposition processing, and Rank indicates a quantity of data streams.

S203. The first network device averages the S first interference covariance matrices corresponding to the S idle resource blocks to obtain a first average matrix.

In this embodiment, the first network device averages the S first interference covariance matrices corresponding to the S idle resource blocks to obtain the first average matrix.

For ease of understanding, the following further describes the foregoing step by using a formula. First, the first symbol that is interfered with is determined as the start uplink symbol. In this embodiment, the symbol 0 is further used as an example, and then the first interference covariance matrix corresponding to each idle resource block on the symbol 0 is calculated.

Specifically, the S first interference covariance matrices Ruu(i) corresponding to the S idle resource blocks are averaged to obtain the first average matrix. Calculation is specifically performed by using the following formula $$Ruu = \frac{\sum_{i \in S} Ruu(i)}{S}$$

Ruu indicates the first average matrix. Ruu(i) indicates the first interference covariance matrix, and S indicates a quantity of idle resource blocks in the start uplink symbol.

S204. The first network device performs singular value decomposition on the first average matrix to obtain a first eigenvector matrix.

In this embodiment, the first network device performs SVD on the first average matrix to obtain the first eigenvector matrix. Specifically, the first eigenvector matrix is obtained after SVD is performed on the first average matrix Ruu in the foregoing embodiment.

S205. The first network device selects first Q columns in the first eigenvector matrix, to generate a submatrix, where the submatrix indicates Q pieces of phase information of the remote interference, and Q is an integer greater than or equal to 1.

In this embodiment, the first network device selects the first Q columns in the first eigenvector matrix. The first Q columns in the first eigenvector matrix are Q directions in which the remote interference is caused. Therefore, the submatrix indicating the Q pieces of phase information of the remote interference may be generated.

S206. The first network device calculates a zero-forcing matrix based on the submatrix.

In this embodiment, the first network device calculates the zero-forcing matrix based on the submatrix. Specifically, the zero-forcing matrix may be calculated based on the submatrix by using the following formula:

$$g = I - V_\Omega (V_\Omega^H V_\Omega)^{-1} V_\Omega^H$$

g indicates the zero-forcing matrix, I indicates a unit matrix, $V_\Omega$ indicates the submatrix, and H indicates conjugate transposition processing.

S207. The first network device performs, based on the zero-forcing matrix, zero-forcing processing on an interference noise signal corresponding to a demodulation reference signal, to obtain a second interference covariance matrix, where the zero-forcing processing is for making a signal indicated by the Q pieces of phase information approximate 0.

In this embodiment, the first network device performs, based on the zero-forcing matrix, zero-forcing processing on the interference noise signal corresponding to the demodulation reference signal, to obtain the second interference covariance matrix.

Specifically, a received signal corresponding to each idle resource block in the demodulation reference signal is calculated. It can be learned from the foregoing embodiment that the idle resource block is a resource block that carries no data. Therefore, the received signal on the idle resource block is an interference noise signal. As a result, the zero-forcing processing is performed on the interference noise signal corresponding to the demodulation reference signal by using the zero-forcing matrix, to obtain the second interference covariance matrix.

For ease of understanding, the following further describes the foregoing step by using a formula. First, the interference noise signal corresponding to the demodulation reference signal is obtained, and then the example in which the received signal on the $i^{th}$ idle resource block in the start uplink symbol $r_i \in C^{N*Rank}$ is further used. Therefore, a second interference covariance matrix corresponding to the $i^{th}$ idle resource block may be calculated by using the following formula:

$$R_{DRMS,i} = \frac{1}{12}\sum_{k=i*12}^{i*12+11} (\hat{r}_k)(\hat{r}_k)^H$$

$R_{DRMS,i}$ indicates the second interference covariance matrix, $\hat{r}_k$ indicates the received signal on the $K^{th}$ subcarrier in the uplink symbol, and H indicates conjugate transposition processing.

Specifically, a received signal on the $i^{th}$ idle resource block in the demodulation reference signal is calculated by using the following formula:

$$\hat{r}_k = g(r_k - \hat{h}_k s_k)$$

$r_k$ indicates the received signal, $\hat{h}_k$ indicates a channel estimation result that is of the $K^{th}$ subcarrier and that is obtained by using the demodulation reference signal, $s_k$ indicates a transmit pilot symbol of the $K^{th}$ subcarrier in the demodulation reference signal, g indicates the zero-forcing matrix, and $(r_k - \hat{h}_k s_k)$ indicates an interference noise signal of a $K^{th}$ resource element (RE) in the $i^{th}$ idle resource block.

It can be learned from the foregoing formula that, zero-forcing processing is performed on the interference noise signal of the $K^{th}$ resource element in the $i^{th}$ idle resource block by using the zero-forcing matrix, to make the interference noise signal approximate 0 in Q remote interference directions, thereby suppressing impact of the remote interference. Then, zero-forcing processing is performed on the interference noise signal on each idle resource by using the zero-forcing matrix through a step similar to the foregoing step, to obtain the second interference covariance matrix $R_{DMRS,i}$ corresponding to each idle resource.

S208. The first network device determines a downlink transmitting weight and an uplink equalization weight based on the second interference covariance matrix.

In this embodiment, the first network device determines the downlink transmitting weight and/or the uplink equalization weight based on the second interference covariance matrix. Specifically, the first network device averages the second interference covariance matrix corresponding to each idle resource to obtain a second average matrix, and then determines the downlink transmitting weight and/or the uplink equalization weight based on the second average matrix.

Optionally, the first network device may further determine a channel estimation result based on a received signal, and the channel estimation result is obtained after zero-forcing processing is performed through the zero-forcing matrix based on the received signal. Therefore, the first network device may calculate the uplink equalization weight and the downlink transmitting weight based on the second average matrix and the channel estimation result obtained after the zero-forcing is performed by using the zero-forcing matrix.

(2) The strength of the interference caused by the downlink signal of the first network device to the uplink signal of the second network device is not equal to the strength of the interference caused by the downlink signal of the second network device to the uplink signal of the first network device.

Figure 7:
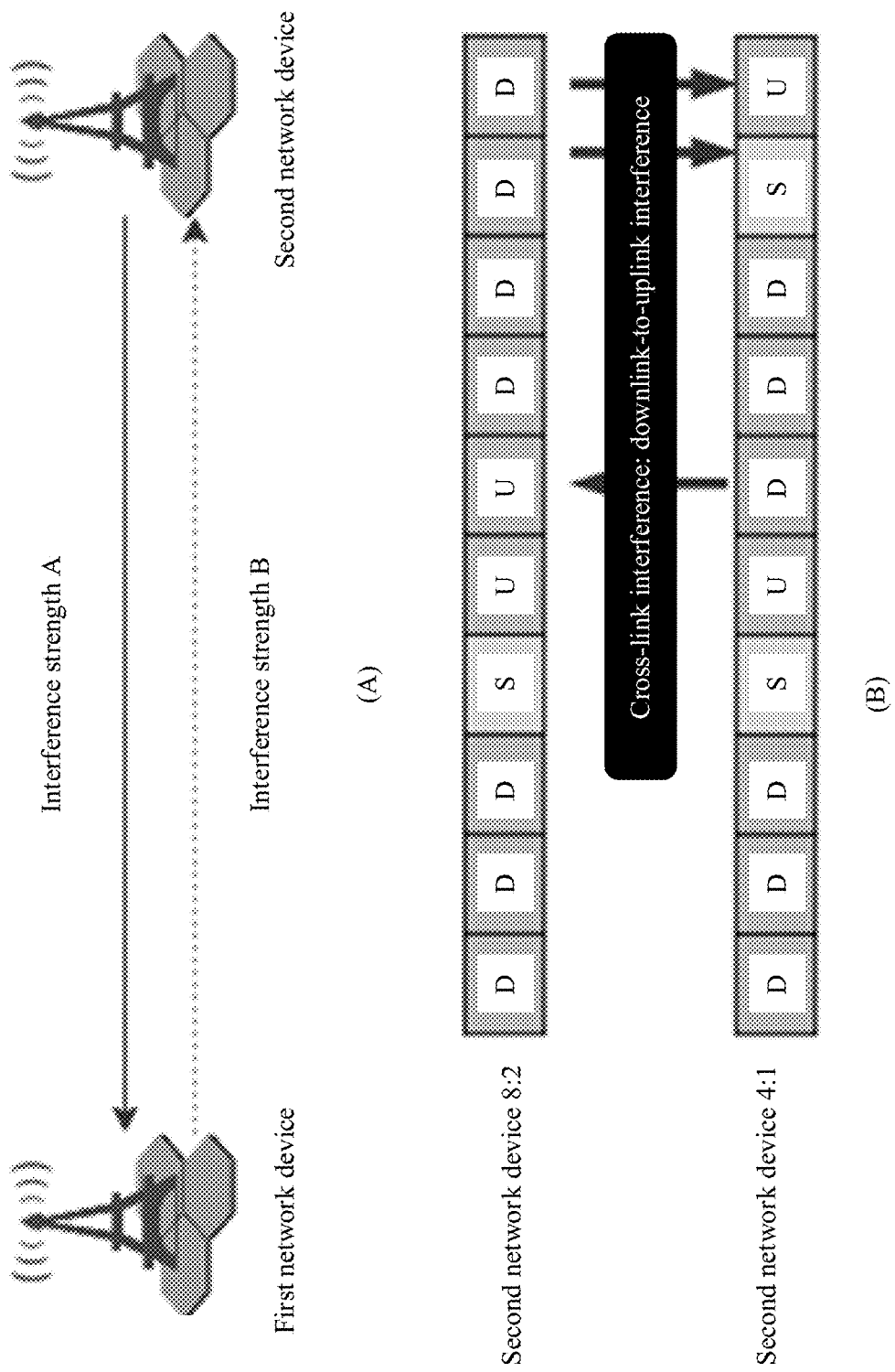
FIG. 7 is a schematic diagram of an embodiment in which mutual interference between network devices is not equal according to embodiments of this application.

Specifically, in a scenario in which the mutual interference between the network devices is not equal, FIG. 7 is a schematic diagram of an embodiment in which mutual interference between network devices is not equal according to embodiments of this application. As shown in (A) in FIG. 7, the strength of the interference caused by the downlink signal of a second network device to the uplink signal of the first network device is interference strength A, the strength of the interference caused by the downlink signal of the first network device to the uplink signal of the second network device is interference strength B. and the interference strength A is not equal to the interference strength B. This usually occurs when downlink configurations of the first network device and the second network device are different. For ease of understanding, an example in which the configuration of the first network device is 4:1 and the configuration of the second network device is 8:2 is used for description. As shown in (B) in FIG. 7, the first network device has only one downlink symbol that causes interference to an uplink slot of the second network device, and the second network device has two downlink symbols that cause interference to an uplink slot of the first network device. In this case, the first network device needs to determine the submatrix by using a sounding sequence sent by the second network device.

Second, because the mutual interference between the network devices is not equal, the uplink equalization weight and the downlink transmitting weight need to be separately calculated. The following separately describes a corresponding remote interference suppression method for calculating the uplink equalization weight and a corresponding remote interference suppression method for calculating the downlink transmitting weight.

1. Uplink Equalization Weight.

Figure 8:
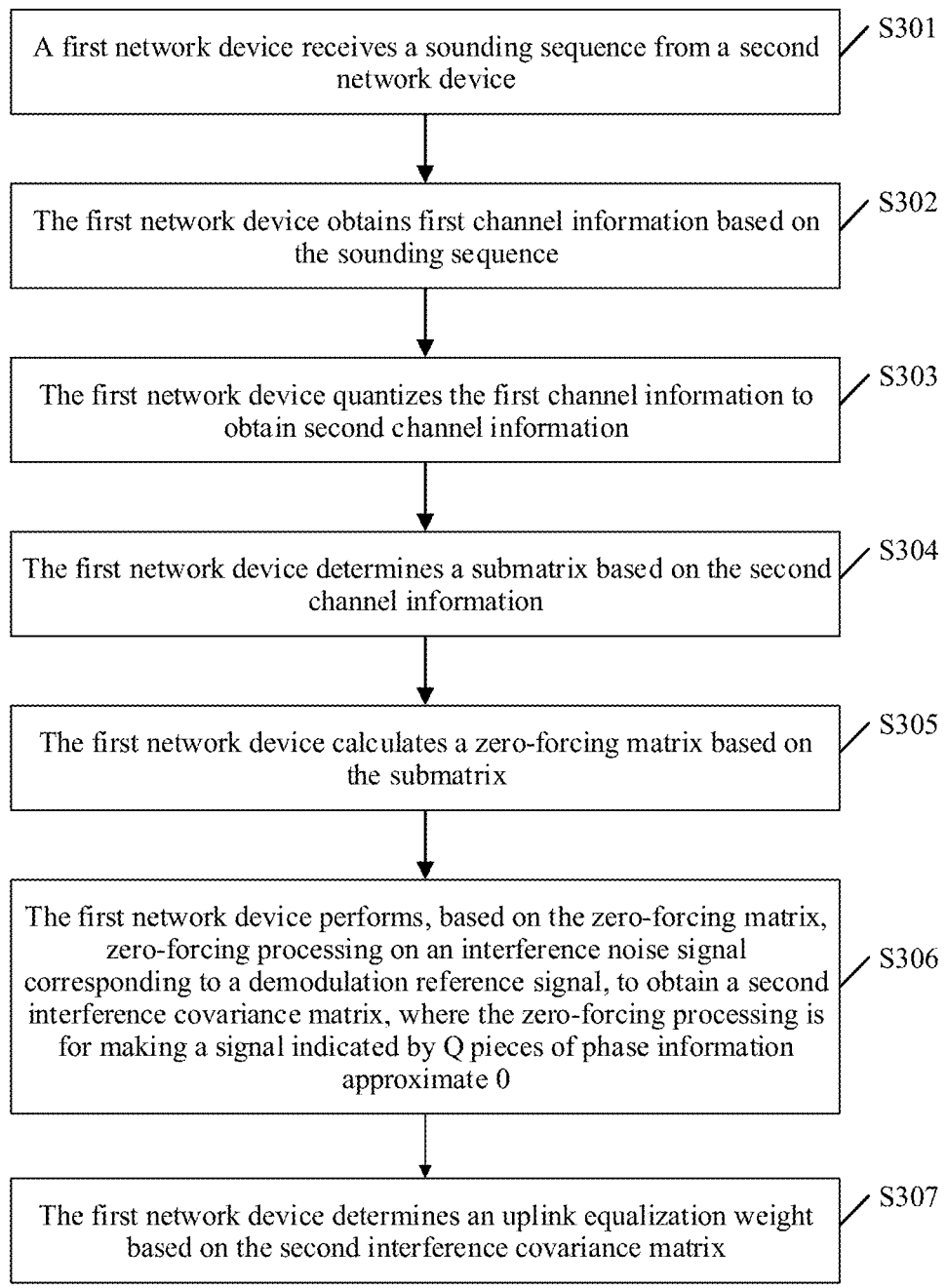
FIG. 8 is a schematic diagram of another embodiment of a remote interference suppression method according to embodiments of this application.

Specifically, FIG. 8 is a schematic diagram of another embodiment of a remote interference suppression method according to embodiments of this application. The remote interference suppression method includes the following steps.

S301. A first network device receives a sounding sequence from a second network device.

In this embodiment, the first network device receives the sounding sequence from the second network device, where the sounding sequence may be a sounding sequence sent through each antenna of the second network device, or may be sounding sequences alternately sent to the first network device through a plurality of groups of antennas, to improve a sending rate, where the second network device groups every eight antennas into one group. An example in which the second network device has 64 antennas is used for description. In this case, sounding sequences may be respectively sent to the first network device through the 64 antennas. Alternatively, an antenna 1 to an antenna 8 may be grouped into one group, and an antenna 9 to an antenna 16 may be grouped into one group. By analogy, the antennas are grouped into eight groups, and sounding sequences are alternately sent to the first network device through the eight groups of antennas. It should be understood that a manner of sending the sounding sequence by the second network device is not limited herein, provided that the first network device can receive channel information in the sounding sequence sent through each antenna of the second network device.

S302. The first network device obtains first channel information based on the sounding sequence.

In this embodiment, after receiving the sounding sequence, the first network device may perform calculation on the sounding sequence by using a least square (LS) channel estimation algorithm, and accordingly obtain the first channel information that is from the second network device to the first network device. It should be understood that, in actual application, the first channel information may alternatively be obtained by performing calculation on the sounding sequence by using a minimum mean square error (MMSE) channel estimation algorithm, a linear minimum mean square error (LMMSE) channel estimation algorithm, or the like. Therefore, the LS channel estimation algorithm should not be construed as a limitation on this embodiment.

S303. The first network device quantizes the first channel information to obtain second channel information.

In this embodiment, to reduce an information storage amount, the first network device quantizes the first channel information to obtain the second channel information.

S304. The first network device determines a submatrix based on the second channel information.

In this embodiment, the first network device determines the submatrix based on the second channel information.

Optionally, the first network device may determine the submatrix based on the second channel information in two manners. The following separately describes the two manners. In a first manner, the first network device determines phase information of first Q beams in the second channel information as Q pieces of phase information of Q remote interferences, and then generates the submatrix based on the Q pieces of phase information of the Q remote interferences. In a second manner, the first network device performs singular value decomposition on the second channel information to determine a second eigenvector matrix, selects first Q columns in the second eigenvector matrix, determines the first Q columns as Q pieces of phase information of Q remote interferences, and finally generates the submatrix based on the Q pieces of phase information of the Q remote interferences. A specific manner of determining the submatrix is not limited herein.

S305. The first network device calculates a zero-forcing matrix based on the submatrix.

In this embodiment, the first network device calculates the zero-forcing matrix based on the submatrix. A specific manner is similar to that in step S206, and details are not described herein again.

S306. The first network device performs, based on the zero-forcing matrix, zero-forcing processing on an interference noise signal corresponding to a demodulation reference signal, to obtain a second interference covariance matrix, where the zero-forcing processing is for making a signal indicated by the Q pieces of phase information approximate 0.

In this embodiment, the first network device performs, based on the zero-forcing matrix, zero-forcing processing on the interference noise signal corresponding to the demodulation reference signal, to obtain the second interference covariance matrix. A specific manner is similar to that in step S207, and details are not described herein again.

S307. The first network device determines an uplink equalization weight based on the second interference covariance matrix.

In this embodiment, the first network device determines the uplink equalization weight based on the second interference covariance matrix. Specifically, the first network device averages the second interference covariance matrix corresponding to each idle resource to obtain a second average matrix, and then determines the uplink equalization weight based on the second average matrix.

Optionally, the first network device may further determine a channel estimation result based on a received signal, and the channel estimation result is obtained after zero-forcing processing is performed through the zero-forcing matrix based on the received signal. Therefore, the first network device may calculate the uplink equalization weight based on the second average matrix and the channel estimation result obtained after the zero-forcing is performed by using the zero-forcing matrix.

2. Downlink Transmitting Weight.

Figure 9:
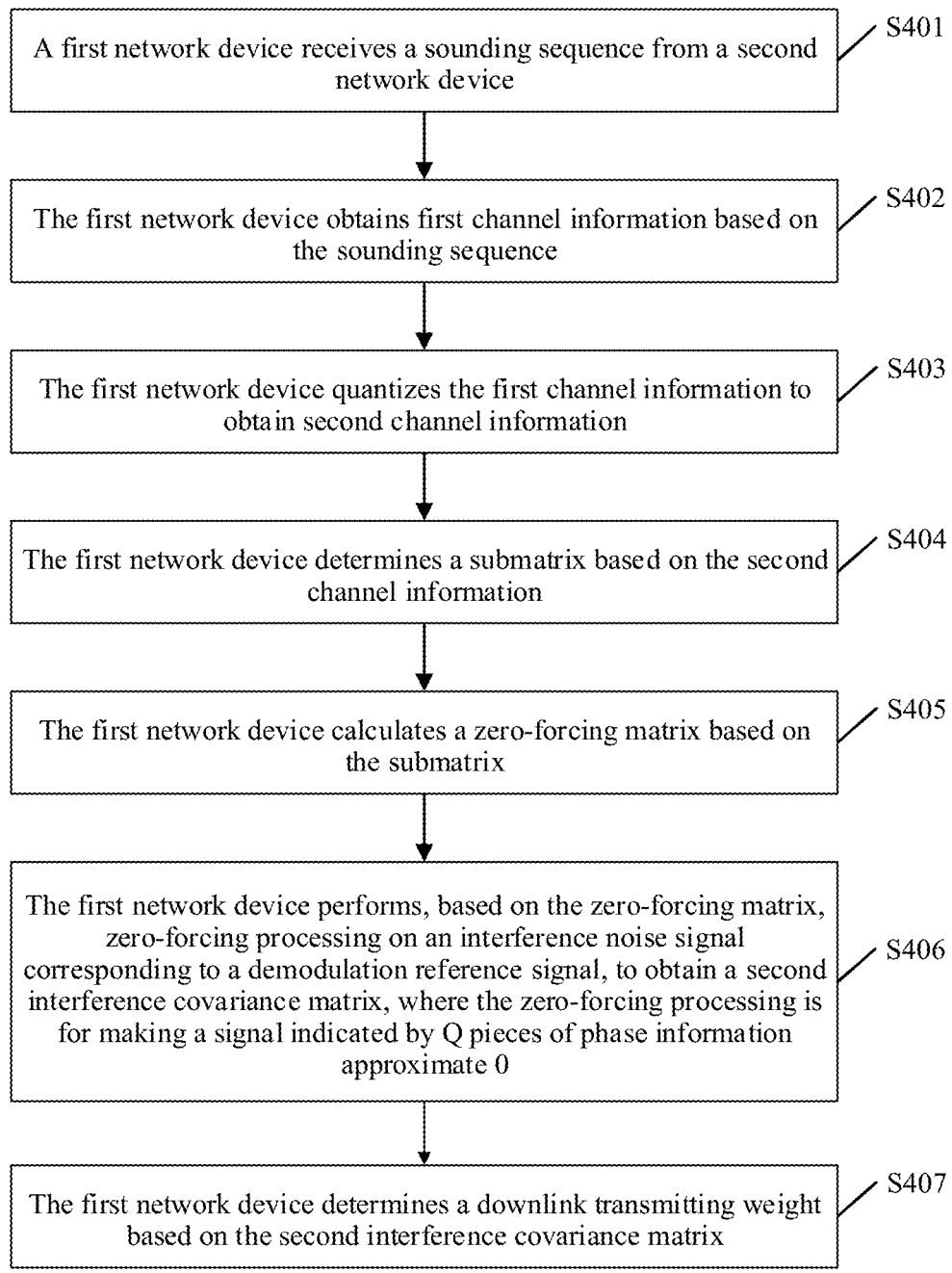
FIG. 9 is a schematic diagram of another embodiment of a remote interference suppression method according to embodiments of this application.

Specifically, FIG. 9 is a schematic diagram of another embodiment of a remote interference suppression method according to embodiments of this application. The remote interference suppression method includes the following steps.

S401. A first network device receives a sounding sequence from a second network device.

In this embodiment, the first network device receives the sounding sequence from the second network device. A specific manner is similar to that in step S301, and details are not described herein again.

S402. The first network device obtains first channel information based on the sounding sequence.

In this embodiment, after receiving the sounding sequence, the first network device may perform calculation on the sounding sequence by using an LS channel estimation algorithm, and accordingly obtain the first channel information that is from the second network device to the first network device. It should be understood that, in actual application, the first channel information may alternatively be obtained by performing calculation on the sounding sequence by using an MMSE channel estimation algorithm, an LMMSE channel estimation algorithm, or the like. Therefore, the LS channel estimation algorithm should not be construed as a limitation on this embodiment.

S403. The first network device quantizes the first channel information to obtain second channel information.

In this embodiment, to reduce an information storage amount, the first network device quantizes the first channel information to obtain the second channel information. A specific manner is similar to that in step S303, and details are not described herein again.

S404. The first network device determines a submatrix based on the second channel information.

In this embodiment, the first network device determines the submatrix based on the second channel information. A specific manner is similar to that in step S304, and details are not described herein again.

S405. The first network device calculates a zero-forcing matrix based on the submatrix.

In this embodiment, the first network device calculates the zero-forcing matrix based on the submatrix. A specific manner is similar to that in step S305, and details are not described herein again.

S406. The first network device performs, based on the zero-forcing matrix, zero-forcing processing on an interference noise signal corresponding to a demodulation reference signal, to obtain a second interference covariance matrix, where the zero-forcing processing is for making a signal indicated by Q pieces of phase information approximate 0.

In this embodiment, the first network device performs, based on the zero-forcing matrix, zero-forcing processing on the interference noise signal corresponding to the demodulation reference signal, to obtain the second interference covariance matrix. A specific manner is similar to that in step S306, and details are not described herein again.

S407. The first network device determines a downlink transmitting weight based on the second interference covariance matrix.

In this embodiment, the first network device determines the downlink transmitting weight based on the second interference covariance matrix. Specifically, the first network device averages the second interference covariance matrix corresponding to each idle resource to obtain a second average matrix, and then determines the downlink transmitting weight based on the second average matrix.

Optionally, the first network device may further determine a channel estimation result based on a received signal, and the channel estimation result is obtained after zero-forcing processing is performed through the zero-forcing matrix based on the received signal. Therefore, the first network device may calculate the downlink transmitting weight based on the second average matrix and the channel estimation result obtained after the zero-forcing is performed by using the zero-forcing matrix.

The foregoing describes the method flowcharts in embodiments of this application. It may be understood that the processor 111 shown in FIG. 2 may perform the method corresponding to step S101 and step S102 in FIG. 3, or the processor 111 may perform the method corresponding to step S201 to step S208 in FIG. 6. The network interface 114 may perform the method corresponding to step S301 in FIG. 8 for receiving the sounding sequence from the second network device, and the processor 111 may perform the method corresponding to step S302 to step S307 in FIG. 8. Alternatively, the network interface 114 may perform the method corresponding to step S401 in FIG. 9 for receiving the sounding sequence from the second network device, and the processor 111 may perform the method corresponding to step S401 to step S407 in FIG. 8.

Figure 10:
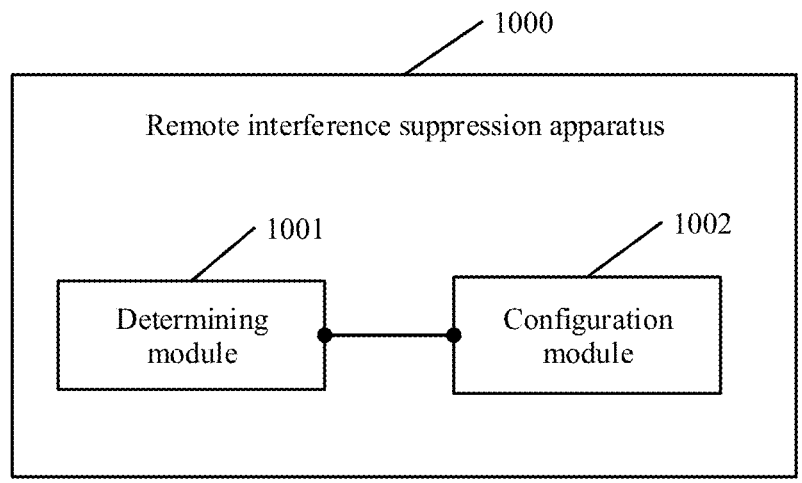
FIG. 10 is a schematic diagram of an embodiment of a remote interference suppression apparatus according to embodiments of this application.

FIG. 10 is a schematic diagram of an embodiment of a remote interference suppression apparatus according to embodiments of this application. The remote interference suppression apparatus 1000 may perform the methods described in the foregoing method embodiments. For details, refer to the descriptions in the foregoing method embodiments. The remote interference suppression apparatus 1000 may be used in a communication device, a circuit, a hardware component, or a chip. For example, the remote interference suppression apparatus 1000 may be a network device or a chip in the network device. The remote interference suppression apparatus 1000 includes a determining module 1001 and a configuration module 1002.

The determining module 1001 is configured to determine that N uplink symbols are interfered with, where N is an integer greater than or equal to 1.

The configuration module 1002 is configured to configure, by using a first mapping type of a physical uplink shared channel (PUSCH), one or more symbols other than the N uplink symbols for uplink PUSCH transmission.

In a possible design, the N uplink symbols are consecutive uplink symbols.

The determining module is further configured to determine an uplink symbol next to the N uplink symbols as a start location.

In a possible design, the first mapping type is a type B.

In a possible design,
the determining module 1001 is specifically configured to: if noise values corresponding to the N uplink symbols are separately greater than a noise threshold, determine that the N uplink symbols are interfered with.

In a possible design,
the determining module 1001 is specifically configured to determine, based on time domain resource configuration information of a first network device, time domain resource configuration information of a second network device, and a distance between the first network device and the second network device, that the N uplink symbols are interfered with.

In a possible design,
the configuration module 1002 is specifically configured to:
if the distance between the first network device and the second network device is less than a distance threshold, configure, by using the first mapping type, the one or more symbols other than the N uplink symbols for the uplink PUSCH transmission; or
if N is less than a remote interference quantity threshold, configure, by using the first mapping type, the one or more symbols other than the N uplink symbols for the uplink PUSCH transmission.

Figure 11:
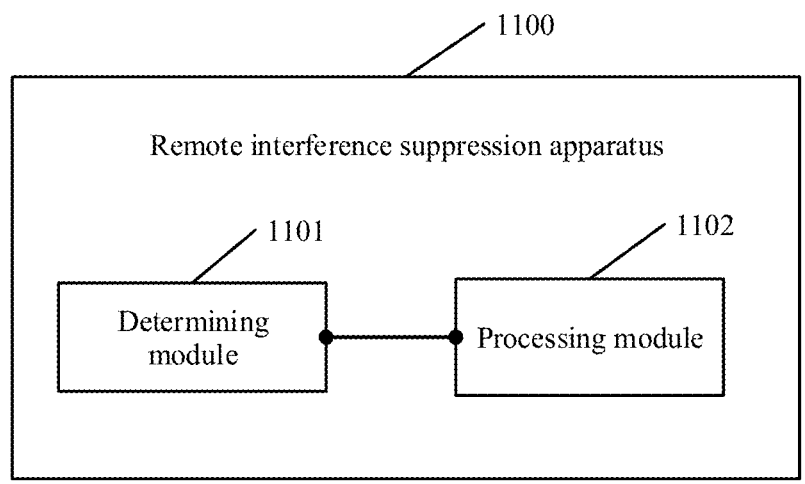
FIG. 11 is a schematic diagram of another embodiment of a remote interference suppression apparatus according to embodiments of this application.

The following describes another remote interference suppression apparatus in this application in detail. FIG. 11 is a schematic diagram of another embodiment of a remote interference suppression apparatus according to embodiments of this application. As shown in FIG. 11, the remote interference suppression apparatus 1100 includes:

a determining module 1101, configured to determine the first symbol that is interfered with in a subframe as a start uplink symbol, where the determining module 1101 is further configured to determine S first interference covariance matrices based on S idle resource blocks included in the start uplink symbol, where the S first interference covariance matrices include an interference noise signal received on the S idle resource blocks, and S is an integer greater than or equal to 1; and a processing module 1102, configured to average the S first interference covariance matrices corresponding to the S idle resource blocks to obtain a first average matrix, where the processing module 1102 is further configured to perform singular value decomposition on the first average matrix to obtain a first eigenvector matrix;

the processing module 1102 is further configured to select first Q columns in the first eigenvector matrix to generate a submatrix, where the submatrix indicates Q pieces of phase information of remote interference, and Q is an integer greater than or equal to 1;

the processing module 1102 is further configured to calculate a zero-forcing matrix based on the submatrix;

the processing module 1102 is further configured to perform, based on the zero-forcing matrix, zero-forcing processing on an interference noise signal corresponding to a demodulation reference signal, to obtain a second interference covariance matrix, where the zero-forcing processing is for making a signal indicated by the Q pieces of phase information approximate 0; and the determining module 1101 is further configured to determine a downlink transmitting weight and an uplink equalization weight based on the second interference covariance matrix.

In a possible design, strength of interference caused by a downlink signal of a first network device to an uplink signal of a second network device is equal to strength of interference caused by a downlink signal of the second network device to an uplink signal of the first network device.

In a possible design,
the determining module 1101 is specifically configured to:
average the second interference covariance matrix corresponding to the S idle resource blocks to obtain a second average matrix; and
determine the downlink transmitting weight and the uplink equalization weight based on the second average matrix.

In a possible design,
the determining module 1101 is further configured to determine a channel estimation result based on a received signal; and
the determining module 1101 is specifically configured to determine the downlink transmitting weight and the uplink equalization weight based on the second average matrix and the channel estimation result.

Figure 12:
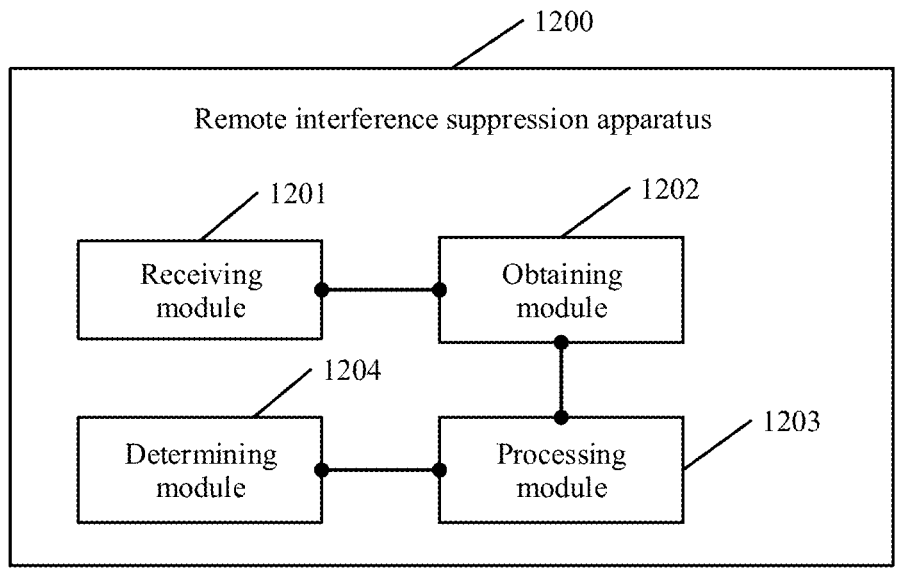
FIG. 12 is a schematic diagram of another embodiment of a remote interference suppression apparatus according to embodiments of this application.

The following describes still another remote interference suppression apparatus in this application in detail. FIG. 12 is a schematic diagram of another embodiment of a remote interference suppression apparatus according to embodiments of this application. As shown in FIG. 12, the remote interference suppression apparatus 1200 includes:

a receiving module 1201, configured to receive a sounding sequence from a second network device;
an obtaining module 1202, configured to obtain first channel information based on the sounding sequence;
a processing module 1203, configured to quantize the first channel information to obtain second channel information; and
a determining module 1204, configured to determine a submatrix based on the second channel information.

The processing module 1203 is further configured to calculate a zero-forcing matrix based on the submatrix.

The processing module 1203 is further configured to perform, based on the zero-forcing matrix, zero-forcing processing on an interference noise signal corresponding to a demodulation reference signal, to obtain a second interference covariance matrix, where the zero-forcing processing is for making a signal indicated by Q pieces of phase information approximate 0.

The determining module 1204 is further configured to determine an uplink equalization weight based on the second interference covariance matrix.

In a possible design, strength of interference caused by a downlink signal of a first network device to an uplink signal of the second network device is not equal to strength of interference caused by a downlink signal of the second network device to an uplink signal of the first network device.

In a possible design,
the determining module 1204 is specifically configured to: determine phase information of first Q beams in the second channel information as the Q pieces of phase information of Q remote interferences; and
generate the submatrix based on the Q pieces of phase information of the Q remote interferences.

In a possible design,
the determining module 1204 is specifically configured to: perform singular value decomposition on the second channel information, to determine a second eigenvector matrix;
select first Q columns in the second eigenvector matrix, and determine the first Q columns as the Q pieces of phase information of Q remote interferences; and
generate the submatrix based on the Q pieces of phase information of the Q remote interferences.

In a possible design,
the determining module 1204 is specifically configured to: average the second interference covariance matrix corresponding to the S idle resource blocks to obtain a second average matrix; and
determine the uplink equalization weight based on the second average matrix.

In a possible design,
the determining module 1204 is further configured to determine a channel estimation result based on a received signal; and
the determining module 1204 is specifically configured to determine the uplink equalization weight based on the second average matrix and the channel estimation result.

Figure 13:
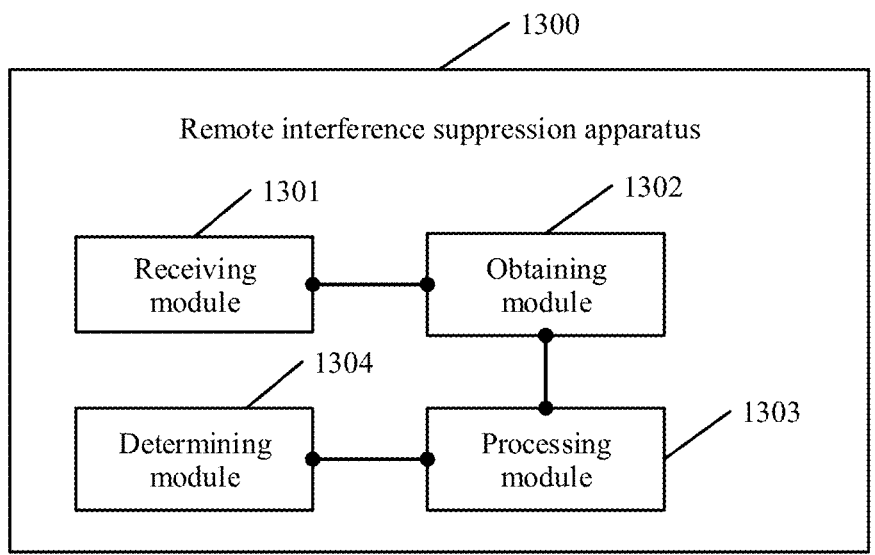
FIG. 13 is a schematic diagram of another embodiment of a remote interference suppression apparatus according to embodiments of this application.

The following describes yet another remote interference suppression apparatus in this application in detail. FIG. 13 is a schematic diagram of another embodiment of a remote interference suppression apparatus according to embodiments of this application. As shown in FIG. 13, the remote interference suppression apparatus 1300 includes:
a receiving module 1301, configured to receive a sounding sequence from a second network device;
an obtaining module 1302, configured to obtain first channel information based on the sounding sequence;
a processing module 1303, configured to quantize the first channel information to obtain second channel information; and
a determining module 1304, configured to determine a submatrix based on the second channel information.

The processing module 1303 is further configured to calculate a zero-forcing matrix based on the submatrix.

The processing module 1303 is further configured to perform, based on the zero-forcing matrix, zero-forcing processing on an interference noise signal corresponding to a demodulation reference signal, to obtain a second interference covariance matrix, where the zero-forcing processing is for making a signal indicated by Q pieces of phase information approximate 0.

The determining module 1304 is further configured to determine a downlink transmitting weight based on the second interference covariance matrix.

In a possible design, strength of interference caused by a downlink signal of a first network device to an uplink signal of the second network device is not equal to strength of interference caused by a downlink signal of the second network device to an uplink signal of the first network device.

In a possible design,
the determining module 1304 is specifically configured to: determine phase information of first Q beams in the second channel information as the Q pieces of phase information of Q remote interferences; and
generate the submatrix based on the Q pieces of phase information of the Q remote interferences.

In a possible design,
the determining module 1304 is specifically configured to: perform singular value decomposition on the second channel information to determine a second eigenvector matrix;
select first Q columns in the second eigenvector matrix, and determine the first Q columns as the Q pieces of phase information of Q remote interferences; and
generate the submatrix based on the Q pieces of phase information of the Q remote interferences.

In a possible design,
the determining module 1304 is specifically configured to: average the second interference covariance matrix corresponding to S idle resource blocks to obtain a second average matrix; and
determine the downlink transmitting weight based on the second average matrix.

In a possible design, the determining module 1304 is further configured to determine a channel estimation result based on a received signal, and
the determining module 1304 is specifically configured to determine the downlink transmitting weight based on the second average matrix and the channel estimation result.

The foregoing describes the method flowcharts in embodiments of this application. It should be understood that a network device may have a functional unit corresponding to the step of the method or procedure performed by the network device. One or more of the foregoing modules or units may be implemented by software, hardware, or a combination thereof. When any one of the foregoing modules or units is implemented by software, the software exists in a form of computer program instructions, and is stored in a memory. A processor may be configured to execute the program instructions to implement the foregoing method procedures.

The processor in this application may include but is not limited to at least one of the following various computing devices that run software: a central processing unit (CPU), a microprocessor, a digital signal processor (DSP), a microcontroller unit (MCU), or an artificial intelligence processor. Each computing device may include one or more cores configured to execute software instructions to perform an operation or processing. The processor may be an independent semiconductor chip, or may be integrated with another circuit into a semiconductor chip. For example, the processor may form a SoC (a system-on-a-chip) with another circuit (such as a codec circuit, a hardware acceleration circuit, or various buses and interface circuits). Alternatively, the processor may be integrated into an ASIC as a built-in processor of the ASIC, and the ASIC integrated with the processor may be separately packaged, or may be packaged with another circuit. In addition to the core configured to execute software instructions to perform the operation or processing, the processor may further include a necessary hardware accelerator, for example, a field programmable gate array (FPGA), a PLD (programmable logic device), or a logic circuit that implements a dedicated logic operation.

The memory in embodiments of this application may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed to a computer. However, the memory is not limited thereto.

In addition to a data bus, the bus may further include a power bus, a control bus, a status signal bus, and the like. However, for clear description, various types of buses in the figures are marked as the bus.

In an implementation process, steps in the foregoing methods can be implemented by using a hardware integrated logic circuit in the processor, or by using instructions in a form of software. The steps in the methods disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

According to the methods provided in embodiments of this application, an embodiment of this application further provides a system, including the foregoing apparatus and one or more network devices.

As defined in embodiments of this application, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

It should be further understood that, "first", "second", "third", "fourth", and various numbers in this specification are merely used for differentiation for ease of description, and are not intended to limit the scope of embodiments of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects.

It should be understood that sequence numbers of the foregoing processes do not mean execution sequences in various embodiments of this application. The execution sequences of the processes should be determined according to functions and internal logic of the processes, and should not be construed as any limitation on implementation processes of embodiments of this application.

A person of ordinary skill in the art may be aware that, various illustrative logical blocks and steps described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical from, a mechanical from, or other forms.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A remote interference suppression method, comprising:
determining, by a first network device, that N uplink symbols are interfered with, wherein the N uplink symbols are consecutive uplink symbols, and wherein N is an integer greater than or equal to 1; and
configuring, by the first network device by using a first mapping type of a physical uplink shared channel (PUSCH), one or more symbols other than the N uplink symbols for uplink PUSCH transmission.

2. The method according to claim 1, wherein:
the first network device determines an uplink symbol next to the N uplink symbols as a start location.

3. The method according to claim 1, wherein the first mapping type is a type B.

4. The method according to claim 1, wherein the determining, by a first network device, that N uplink symbols are interfered with comprises:
if noise values corresponding to the N uplink symbols are separately greater than a noise threshold, determining, by the first network device, that the N uplink symbols are interfered with.

5. The method according to claim 1, wherein the determining, by a first network device, that N uplink symbols are interfered with comprises:
determining, by the first network device based on time domain resource configuration information of the first network device, time domain resource configuration information of a second network device, and a distance between the first network device and the second network device, that the N uplink symbols are interfered with.

6. The method according to claim 5, wherein the configuring, by the first network device by using a first mapping type of a physical uplink shared channel (PUSCH), one or more symbols other than the N uplink symbols for uplink PUSCH transmission comprises:
if a distance between the first network device and the second network device is less than a distance threshold, configuring, by the first network device by using the first mapping type, the one or more symbols other than the N uplink symbols for the uplink PUSCH transmission; or
if N is less than a remote interference quantity threshold, configuring, by the first network device by using the first mapping type, the one or more symbols other than the N uplink symbols for the uplink PUSCH transmission.

7. A remote interference suppression method, comprising:
determining, by a first network device, a first symbol that is interfered with in a subframe as a start uplink symbol;
determining, by the first network device, S first interference covariance matrices based on S idle resource blocks comprised in the start uplink symbol, wherein the S first interference covariance matrices indicate an interference noise signal received on the S idle resource blocks, and S is an integer greater than or equal to 1;
averaging, by the first network device, the S first interference covariance matrices corresponding to the S idle resource blocks to obtain a first average matrix;
performing, by the first network device, singular value decomposition on the first average matrix to obtain a first eigenvector matrix;
selecting, by the first network device, first Q columns in the first eigenvector matrix to generate a submatrix, wherein the submatrix indicates Q pieces of phase information of remote interference, and Q is an integer greater than or equal to 1;
calculating, by the first network device, a zero-forcing matrix based on the submatrix;
performing, by the first network device based on the zero-forcing matrix, zero-forcing processing on an interference noise signal corresponding to a demodulation reference signal, to obtain a second interference covariance matrix, wherein the zero-forcing processing is for making a signal indicated by the Q pieces of phase information approximate 0; and
determining, by the first network device, a downlink transmitting weight and an uplink equalization weight based on the second interference covariance matrix.

8. The method according to claim 7, wherein before the determining, by a first network device, a first symbol that is interfered with in a subframe as a start uplink symbol, the method further comprises:
strength of interference caused by a downlink signal of the first network device to an uplink signal of a second network device is equal to strength of interference caused by a downlink signal of the second network device to an uplink signal of the first network device.

9. The method according to claim 7, wherein the determining, by the first network device, a downlink transmitting weight and an uplink equalization weight based on the second interference covariance matrix comprises:
averaging, by the first network device, the second interference covariance matrix corresponding to the S idle resource blocks to obtain a second average matrix; and
determining, by the first network device, the downlink transmitting weight and the uplink equalization weight based on the second average matrix.

10. The method according to claim 9, wherein the method further comprises:
determining, by the first network device, a channel estimation result based on a received signal; and
the determining, by the first network device, the downlink transmitting weight and the uplink equalization weight based on the second average matrix comprises:
determining, by the first network device, the downlink transmitting weight and the uplink equalization weight based on the second average matrix and the channel estimation result.

11. A remote interference suppression method, comprising:
receiving, by a first network device, a sounding sequence from a second network device;
obtaining, by the first network device, first channel information based on the sounding sequence;
quantizing, by the first network device, the first channel information to obtain second channel information;
determining, by the first network device, a submatrix based on the second channel information;
calculating, by the first network device, a zero-forcing matrix based on the submatrix;

performing, by the first network device based on the zero-forcing matrix, zero-forcing processing on an interference noise signal corresponding to a demodulation reference signal, to obtain a second interference covariance matrix, wherein the zero-forcing processing is for making a signal indicated by Q pieces of phase information approximate 0; and determining, by the first network device, an uplink equalization weight based on the second interference covariance matrix.

12. The method according to claim 11, wherein:

strength of interference caused by a downlink signal of the first network device to an uplink signal of the second network device is not equal to strength of interference caused by a downlink signal of the second network device to an uplink signal of the first network device.

13. The method according to claim 11, wherein the determining, by the first network device, a submatrix based on the second channel information comprises:

determining, by the first network device, phase information of first Q beams in the second channel information as the Q pieces of phase information of Q remote interferences; and generating, by the first network device, the submatrix based on the Q pieces of phase information of the Q remote interferences.

14. The method according to claim 11, wherein the determining, by the first network device, a submatrix based on the second channel information comprises:

performing, by the first network device, singular value decomposition on the second channel information to determine a second eigenvector matrix;

selecting, by the first network device, first Q columns in the second eigenvector matrix, and determining the first Q columns as the Q pieces of phase information of Q remote interferences; and generating, by the first network device, the submatrix based on the Q pieces of phase information of the Q remote interferences.

15. The method according to claim 11, wherein the determining, by the first network device, an uplink equalization weight based on the second interference covariance matrix comprises:

averaging, by the first network device, the second interference covariance matrix corresponding to S idle resource blocks to obtain a second average matrix; and determining, by the first network device, the uplink equalization weight based on the second average matrix.

16. The method according to claim 15, wherein the method further comprises:

determining, by the first network device, a channel estimation result based on a received signal; and the determining, by the first network device, the uplink equalization weight based on the second average matrix comprises determining, by the first network device, the uplink equalization weight based on the second average matrix and the channel estimation result.

17. A remote interference suppression method, comprising:

receiving, by a first network device, a sounding sequence from a second network device;

obtaining, by the first network device, first channel information based on the sounding sequence;

quantizing, by the first network device, the first channel information to obtain second channel information;

determining, by the first network device, a submatrix based on the second channel information;

calculating, by the first network device, a zero-forcing matrix based on the submatrix;

performing, by the first network device based on the zero-forcing matrix, zero-forcing processing on an interference noise signal corresponding to a demodulation reference signal, to obtain a second interference covariance matrix, wherein the zero-forcing processing is for making a signal indicated by Q pieces of phase information approximate 0; and determining, by the first network device, a downlink transmitting weight based on the second interference covariance matrix.

18. The method according to claim 17, wherein:

strength of interference caused by a downlink signal of the first network device to an uplink signal of the second network device is not equal to strength of interference caused by a downlink signal of the second network device to an uplink signal of the first network device.

19. The method according to claim 17, wherein the determining, by the first network device, a submatrix based on the second channel information comprises:

determining, by the first network device, phase information of first Q beams in the second channel information as the Q pieces of phase information of Q remote interferences; and generating, by the first network device, the submatrix based on the Q pieces of phase information of the Q remote interferences.

20. The method according to claim 17, wherein the determining, by the first network device, a submatrix based on the second channel information comprises:

performing, by the first network device, singular value decomposition on the second channel information to determine a second eigenvector matrix;

selecting, by the first network device, first Q columns in the second eigenvector matrix, and determining the first Q columns as the Q pieces of phase information of Q remote interferences; and generating, by the first network device, the submatrix based on the Q pieces of phase information of the Q remote interferences.

* * * * *